US010396842B2

(12) United States Patent
Pike, II

(10) Patent No.: US 10,396,842 B2
(45) Date of Patent: Aug. 27, 2019

(54) CASING FOR AN ELECTRONIC DEVICE

(71) Applicant: Admiral Trading Limited, Lai Chi Kok, Kowloon (HK)

(72) Inventor: William Harold Pike, II, Lai Chi Kok (HK)

(73) Assignee: ADMIRAL TRADING LIMITED, Kowloon (HK)

( * ) Notice: Subject to any disclaimer, the term of this patent is extended or adjusted under 35 U.S.C. 154(b) by 0 days.

(21) Appl. No.: 15/568,059

(22) PCT Filed: Apr. 19, 2016

(86) PCT No.: PCT/CN2016/079616
§ 371 (c)(1),
(2) Date: Oct. 20, 2017

(87) PCT Pub. No.: WO2016/169459
PCT Pub. Date: Oct. 27, 2016

(65) Prior Publication Data
US 2018/0145713 A1    May 24, 2018

(30) Foreign Application Priority Data

Apr. 20, 2015 (HK) .................................. 15103820
Sep. 14, 2015 (HK) .................................. 15108979

(51) Int. Cl.
*H05K 5/00* (2006.01)
*H02J 7/00* (2006.01)
*H04M 1/02* (2006.01)
*H04B 1/3888* (2015.01)

(52) U.S. Cl.
CPC .................................. *H04B 1/3888* (2013.01)

(58) Field of Classification Search
CPC . H04B 1/38; H04B 7/15; H04B 7/185; H04B 7/00; H04B 1/02; H04B 1/16; H04B 1/06; H04B 1/3833; H04M 1/00; H04M 10/465; H04W 88/02
See application file for complete search history.

(56) References Cited

U.S. PATENT DOCUMENTS 7,072,696 B2 *  7/2006  Shaff ....................... H04L 12/66
                                                              381/322
7,920,891 B2 *  4/2011  Kwak .................. G08B 25/016
                                                              307/66
8,305,741 B2 * 11/2012  Chatterjee ............ G06F 1/1632
                                                              320/108
(Continued)

FOREIGN PATENT DOCUMENTS

CN        201055064 Y    5/2008
CN        201112394 Y    9/2008
(Continued)

*Primary Examiner* — Pablo N Tran
(74) *Attorney, Agent, or Firm* — Renner Kenner Grieve Bobak Taylor & Weber

(57) ABSTRACT

A casing for an electronic device includes a frame having first electrical port arranged to receive a removable solar panel member, and a power storage module arranged for storing energy for use by the electrical device; wherein the power storage module is arranged to receive energy from the solar panel member when the solar panel member is connected to the first electrical port.

27 Claims, 33 Drawing Sheets

(56) References Cited

U.S. PATENT DOCUMENTS

| | | | |
|---|---|---|---|
| 8,467,835 B2* | 6/2013 | Lee | G06F 1/3231 |
| | | | 455/566 |
| 8,483,786 B2* | 7/2013 | Ramies | B67B 7/16 |
| | | | 455/550.1 |
| 2007/0275770 A1* | 11/2007 | Hyatt | H04M 1/6066 |
| | | | 455/569.2 |
| 2009/0111501 A1* | 4/2009 | Tang | H04W 84/18 |
| | | | 455/522 |
| 2010/0147737 A1 | 6/2010 | Richardson et al. | |
| 2011/0065474 A1* | 3/2011 | Won | H02J 7/355 |
| | | | 455/556.1 |
| 2013/0084919 A1* | 4/2013 | Glynn | H01M 10/465 |
| | | | 455/566 |

FOREIGN PATENT DOCUMENTS

| CN | 201499108 U | 6/2010 |
|---|---|---|
| CN | 103220890 A | 7/2013 |

* cited by examiner

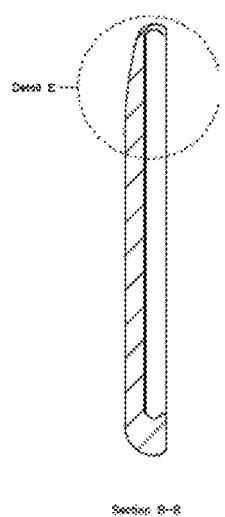
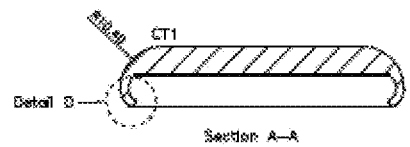
Figure 3G
Figure 3H

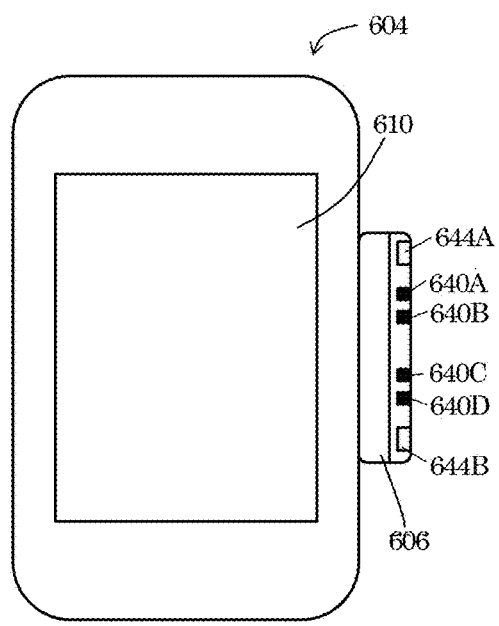
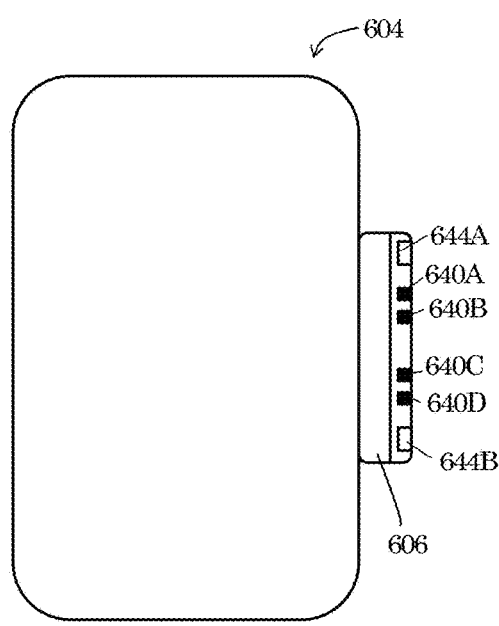
FIGURE 8A
FIGURE 8B
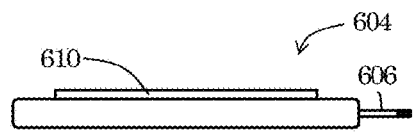
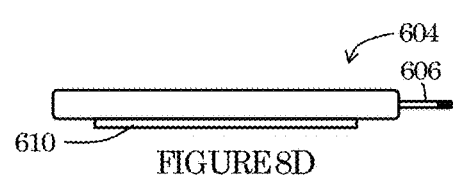
FIGURE 8C
FIGURE 8D

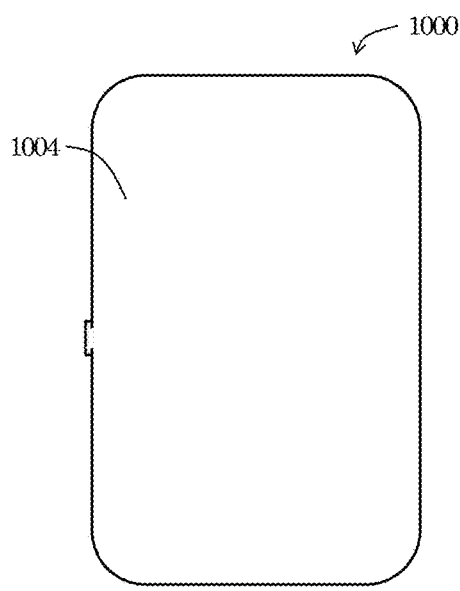
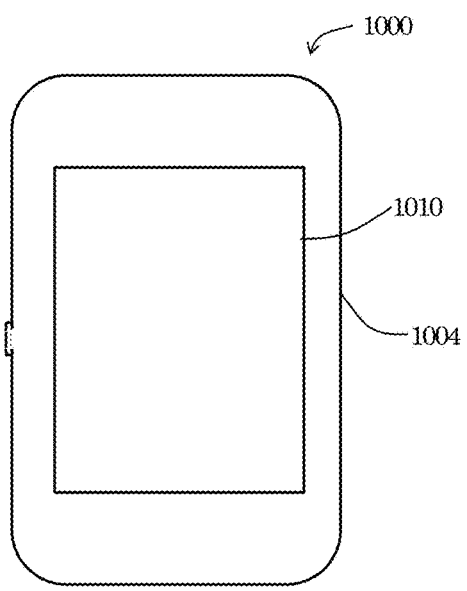
FIGURE 11A
FIGURE 11C
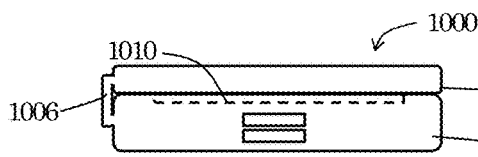
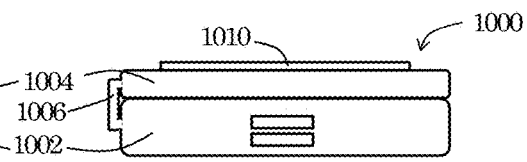
FIGURE 11B
FIGURE 11D

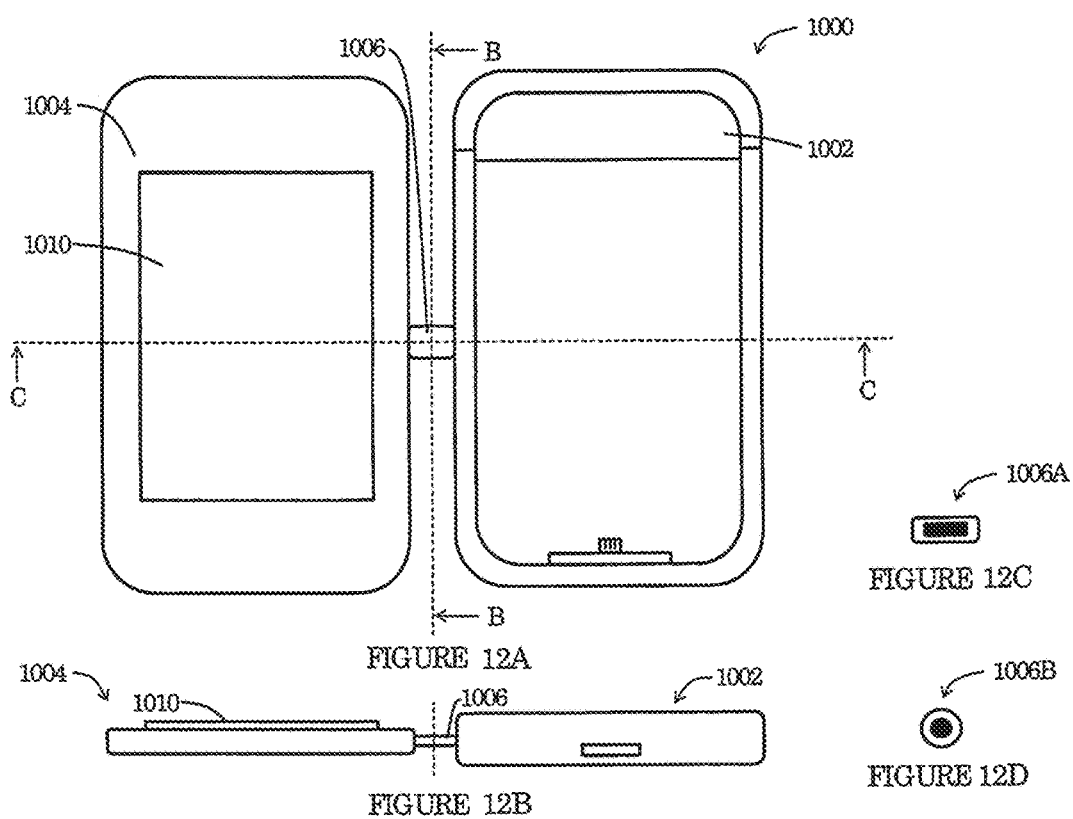

B = Button

◯ Indicates LED Position

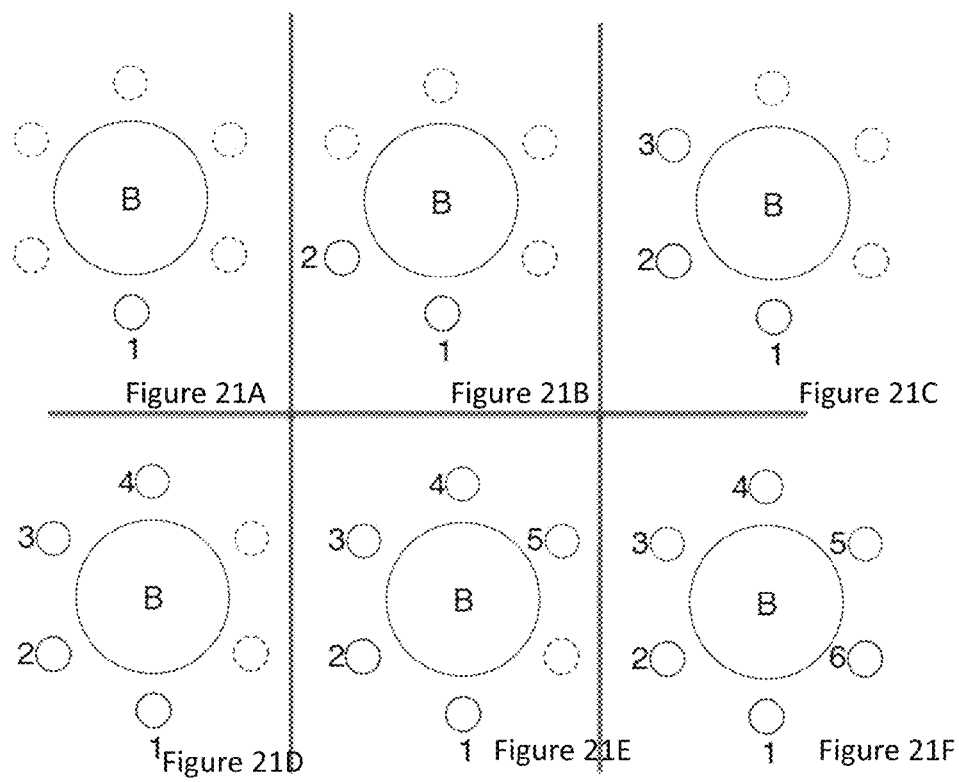

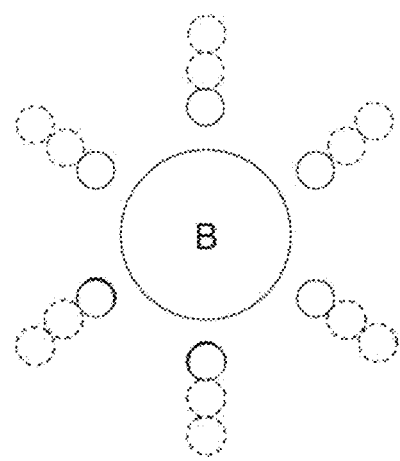
Figure 22B
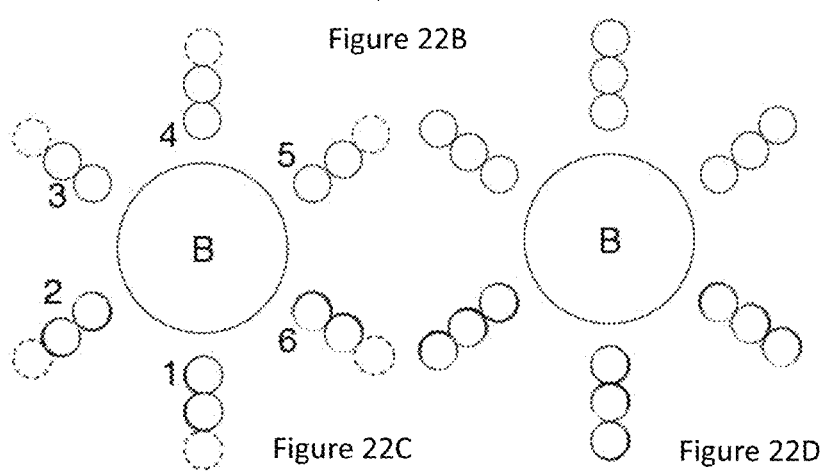
Figure 22C
Figure 22D

LED Lighting Sequence

CASING FOR AN ELECTRONIC DEVICE

TECHNICAL FIELD

The present invention relates to a casing for an electronic device, and particularly, although not exclusively, to a casing for a mobile phone with detachable cap portion engaged at one end of the casing, unique profile and shapes in the rear side and curvature at the edges of the casing, solar charging arrangements adapted to harness solar energy for charging the mobile phone without interfering/minimising the signal sensitive area of the phone, LED configuration with various lighting sequence for indication of charging level and charging progress. The present invention also relates to a foldable three piece multi-chain daisy solar panel assembly for charging a mobile phone or any other electronic devices.

BACKGROUND

Portable electronic devices such as mobile phones or tablet computers are indispensable items nowadays. Most people in developed countries carry at least one of these devices for communication, work and leisure. With the rapid development in electronic and communication technologies, both in terms of hardware and software, the latest portable electronic devices are more and more portable with smaller and slimmer designs.

Generally, the bodies of portable electronic devices are made of relatively rigid and strong material. Depending on the designs, some of these devices may be more durable and can be dropped repeatedly without introducing substantial structural or functional damages to the devices. Whilst some of these devices are more prone to damage or crash when they are dropped. For users who are less careful in handling their devices, this may be particularly problematic. Even for users who are more careful in handling their devices, accidentally dropping the devices may introduce scratches on the devices which may damage the aesthetic appearance of the devices. Even though there are quite a number of phone casings currently available in the market, such casings have certain shortcomings. For example, part of the casing has to be removed from the main part of the casing by the user for the insertion of the smart phone into the casing cavity, and the separated part is lost from the body after repeated usage by user. These phone casings also have poor grasping feel as they are designed without considering aesthetics. After holding these casings for a certain period, the user's hand would become fatigue. Therefore, users tend to remove the casing from the phone shortly after purchasing these casing due to the dissatisfactory user experience.

SUMMARY OF THE INVENTION

In accordance with a first aspect of the present invention, there is provided a casing for an electronic device, comprising a frame having a first electrical port arranged to receive a removable solar panel member, and a power storage module arranged for storing energy for use by the electrical device; wherein the power storage module is arranged to receive energy from the solar panel member when the solar panel member is connected to the first electrical port.

In one embodiment of the first aspect, the frame further comprises a second electrical port arranged to connect the power storage module with the electronic device, and the power storage module is arranged to supply energy to the electronic device when the electronic device is connected with the second electrical port.

In one embodiment of the first aspect, the frame further comprises a third electrical port arranged to connect the power storage module with an external power source, and the power storage module is arranged to receive energy from the external power source when the external power source is connected to the third electrical port.

In one embodiment of the first aspect, the power storage module is arranged to simultaneously receive energy from the external power source and supply energy to the electronic device when both the electronic device and the external power source are connected to the second and third electrical ports.

In one embodiment of the first aspect, the power storage module is arranged to be charged by the solar panel member or by the external power source or by both simultaneously.

In one embodiment of the first aspect, the solar panel member is reversibly connectable with the frame.

In one embodiment of the first aspect, the frame includes a body that defines a cavity for receiving the electronic device.

In one embodiment of the first aspect, the body includes a flexible cap portion arranged to be manipulated for inserting the electronic device into the cavity.

In one embodiment of the first aspect, the body includes one or more through-holes formed thereon to correspond to a position of a camera or one or more button of the electronic device.

In one embodiment of the first aspect, the frame further includes a jack plug arranged to be inserted into a corresponding jack of the electronic device.

In one embodiment of the first aspect, the jack plug is movably formed on the body.

In one embodiment of the first aspect, the jack plug is arranged to be moved and engaged with the solar panel member for supporting the casing in a standing configuration.

In one embodiment of the first aspect, the jack plug is an audio jack plug arranged to be inserted into a corresponding audio jack of the electronic device.

In one embodiment of the first aspect, the frame further comprises one or more control buttons arranged on the body for controlling an operation of the power storage module.

In one embodiment of the first aspect, the frame further comprises an indicator module is arranged on the body for displaying information relating to the power storage module.

In one embodiment of the first aspect, the indicator module comprises one or more LEDs.

In one embodiment of the first aspect, the solar panel member comprises a body having one or more solar panels mounted thereon, and an electrical connection portion for connecting with the first electrical port.

In one embodiment of the first aspect, the electrical connection portion is reversibly connectable with the first electrical port such that the solar panel member is reversibly connectable with the frame.

In one embodiment of the first aspect, the body of the solar panel member is substantially symmetric about a transverse axis or a longitudinal axis thereof.

In one embodiment of the first aspect, the electrical connection portion is flexible.

In one embodiment of the first aspect, the electrical connection portion has a rounded edge and the first electrical port has an angled edge such that a clearance is formed between the electrical connection portion and the first electrical port when the electrical connection portion is connected with the first electrical port.

In one embodiment of the first aspect, the solar panel member is arranged to connect with the first electrical portion by a magnetic arrangement.

In one embodiment of the first aspect, the magnetic arrangement comprises a first magnet member arranged in the electrical connection portion, and a corresponding second magnetic member arranged in the first electrical port.

In one embodiment of the first aspect, the first magnetic member comprises one of a magnet piece or a metal piece, and the second magnetic member comprises another one of the magnet piece or a metal piece.

In one embodiment of the first aspect, both the first and second magnetic members comprise a magnet piece.

In one embodiment of the first aspect, the solar panel member is arranged to connect electrically with the first electrical portion by an electrical arrangement.

In one embodiment of the first aspect, the electrical arrangement comprises one or more electrical contacts arranged in the electrical connection portion, and one or more corresponding electrical contacts arranged in the first electrical port.

In one embodiment of the first aspect, the electrical arrangement comprises two pairs of electrical contacts arranged in the electrical connection portion, and one or more corresponding electrical contacts arranged in the first electrical port; wherein each pair of the electrical contacts includes a positive and a negative contact terminal.

In one embodiment of the first aspect, the electrical connection portion is in the form of a lip, and the first electrical port is an elongated slot shaped to receive the lip.

In one embodiment of the first aspect, the body of the solar panel member comprises a rubberized edge for supporting the casing in a standing configuration.

In one embodiment of the first aspect, a pocket is formed in or on the body of the solar panel member.

In one embodiment of the first aspect, the solar panel member is arranged to form a cover of the casing.

In one embodiment of the first aspect, the power storage module comprises one or more rechargeable batteries.

In one embodiment of the first aspect, the electronic device is a portable electronic device.

In one embodiment of the first aspect, the electronic device is a mobile phone or a smart phone.

In one embodiment of the first aspect, the flexible cap portion is arranged to be continuously engaged to the body when upon the flexible cap portion is manipulated for inserting the electronic device into the cavity.

In one embodiment of the first aspect, the flexible cap portion is engaged to the body by a flexible tongue arranged to resiliently join the flexible cap portion to the body.

In one embodiment of the first aspect, the body includes a curved profile arranged to have a curvature formed by having a geometry defined by at least two curves meeting at co-tangents.

In one embodiment of the first aspect, each of the solar panel members is positioned so as to minimize any signal transmission interference of the electronic device housed within the cavity.

In one embodiment of the first aspect, each of the solar panel members are positioned away from being adjacent to the top or bottom edge of the electronic device.

In accordance with a second aspect of the present invention, there is provided a user manipulable interface for a device comprising: an actuator arranged to be manipulated by a user; a control module arranged to issue electronic instructions to the device based on a manipulation order by the user; and an animated lighting module having a plurality of light emitting members arranged to be controlled by the control module to display an animation associated with the manipulation order.

In one embodiment of the second aspect, the plurality of light emitting members are disposed about the actuator symmetrically to form at least one light emitting ring. In one embodiment of the second aspect, the animation includes the initial lighting of any one of the light emitting members and then the lighting of the light emitting members in clockwise or anti-clockwise direction until all light emitting members are lit.

In one embodiment of the present invention, the casing in one embodiment of the first aspect has a user manipulable interface in one embodiment of the second aspect.

In accordance with a third aspect of the present invention, there is provided a solar panel array comprising a plurality of solar panel members in connection, wherein the solar panel array is foldable such that the solar panel members are substantially concealed by the solar panel array in closed configuration.

In one embodiment of the third aspect, the solar panel array is connectable with at least one identical solar panel array to form a complex solar panel array.

In one embodiment of the third aspect, the solar panel array further comprises a current limiting module to limit the output current of the solar panel array.

In one embodiment of the third aspect, the current limiting module limits the output of the solar panel array to 1 mA.

In accordance with a fourth aspect of the present invention, there is provided a frame of a casing for an electronic device comprising: a body defining a cavity for receiving the electronic device; wherein the body includes a first electrical port arranged to connect with a solar panel member; a second electrical port arranged to connect with the electronic device; and a power storage module in electrical connection with the first electrical port and the second electrical port, the power storage module being arranged in the body for storing energy for use by the electronic device; wherein the power storage module is operable to receive energy from the solar panel member when the solar panel member is connected to the first electrical port, and supply energy to the electronic device when the electronic device is connected to the second electrical port.

In one embodiment of the fourth aspect, the body further includes a third electrical port arranged to connect with an external power source, and the power storage module is further in electrical connection with the third electrical port; wherein the power storage module is further operable to receive energy from the external power source when the external power source is connected to the third electrical port.

In one embodiment of the fourth aspect, the body further includes one or more of: a flexible cap portion arranged to be manipulated for inserting the electronic device into the cavity; a jack plug movably formed on the body insertion into a corresponding jack of the electronic device; and one or more through-holes formed on the body to correspond to a position of a camera or one or more button of the electronic device.

In one embodiment of the fourth aspect, the frame further comprises one or more of: one or more control buttons arranged on the body for controlling an operation of the power storage module; and an indicator module is arranged on the body for displaying information relating to the power storage module.

In one embodiment of the fourth aspect, the first electrical port includes: an electrical arrangement with a plurality of electrical contacts for enabling electrical communication between the frame and the solar panel member, and a magnetic arrangement with a magnet member or a metal member for connecting the solar panel member with the first electrical port.

In one embodiment of the fourth aspect, the solar panel member is arranged to form a cover of the casing.

In one embodiment of the fourth aspect, the solar panel member is reversibly connectable with the frame.

In one embodiment of the fourth aspect, the solar panel member is detachably connectable with the first electrical port.

In one embodiment of the fourth aspect, the power storage module comprises one or more rechargeable batteries.

In one embodiment of the fourth aspect, the electronic device is a portable electronic device.

In one embodiment of the fourth aspect, the electronic device is a mobile phone or a smart phone.

In accordance with a fifth aspect of the present invention, there is provided a cover of a casing for an electronic device, comprising: a body having one or more solar panels mounted thereon, and an electrical connection portion for connecting with an first electrical port of a frame; wherein the one or more solar panels are arranged to transfer energy to the frame when the electrical connection portion is connected with the first electrical port of the frame.

In one embodiment of the fifth aspect, the electrical connection portion further comprises: an electrical arrangement with a plurality of electrical contacts for enabling electrical communication between the frame and the solar panel member, and a magnetic arrangement with a magnet member or a metal member for connecting solar panel member with the first electrical port.

In one embodiment of the fifth aspect, the body of the cover is substantially symmetric about a transverse axis or a longitudinal axis thereof.

In one embodiment of the fifth aspect, the cover is reversibly connectable with the frame.

In one embodiment of the fifth aspect, the cover is detachably connectable with the frame.

In accordance with a sixth aspect of the present invention, there is provided a casing for an electronic device comprising a frame in accordance with the second aspect of the present invention and a cover in accordance with the third aspect of the present invention.

In accordance with a seventh aspect of the present invention, there is provided a. casing for an electronic device, comprising: a frame with a frame body defining a cavity for receiving the electronic device; wherein the frame body includes a first electrical port arranged to connect with a removable solar panel cover; a second electrical port arranged to connect with the electronic device; a power storage module in electrical connection with the first electrical port and the second electrical port, the power storage module being arranged in the body for storing energy for use by the electronic device; wherein the power storage module is operable to receive energy from the solar panel cover when the solar panel member is connected to the first electrical port, and supply energy to the electronic device when the electronic device is connected to the second electrical port; an audio jack plug movably formed on the frame body, the audio jack plug being arranged to be inserted into a corresponding audio jack of the electronic device, and is arranged to be moved and engaged with the solar panel member for supporting the casing in a standing configuration; wherein the solar panel cover includes a body having one or more solar panels mounted thereon, and an electrical connection portion for connecting with the first electrical port of the frame; wherein the one or more solar panels are arranged to transfer energy to the frame when the electrical connection portion is connected with the first electrical port of the frame; wherein the solar panel cover is detachably and reversibly connectable with the frame; and wherein the electrical connection portion of the cover and the first electrical port of the frame includes: an electrical arrangement with one or more electrical contacts for enabling electrical communication between the frame and the solar panel cover; and a magnetic arrangement with one or more magnet and metal members for connecting the solar panel cover with the frame.

It is an object of the present invention to address the above needs, to overcome or substantially ameliorate the above disadvantages or, more generally, to provide a.

BRIEF DESCRIPTION OF THE DRAWINGS

Embodiments of the present invention will now be described, by way of example, with reference to the accompanying drawings in which:

FIG. 3G shows the side view of the frame showing the unique profile of the frame in accordance with one embodiment of the present invention;

FIG. 3H shows the cross section view of the frame showing the curvature of the edges in accordance with one embodiment of the present invention;

FIG. 8A shows a schematic diagram (plan view) of the cover of the casing of FIG. 7A;

FIG. 8B shows a corresponding rear side view of the cover of FIG. 8A;

FIG. 8C shows a schematic diagram (plan view) of the cover of FIG. 8A, with the cover being flipped over;

FIG. 8D shows a corresponding rear side view of the cover of FIG. 8C;

FIG. 11A shows a schematic diagram (plan view) of a casing for an electronic device in a first closed configuration in accordance with yet another embodiment of the present invention;

FIG. 11B shows a rear side view of the casing of FIG. 11A;

FIG. 11C shows a schematic diagram (plan view) of the casing of FIG. 11A in a second closed configuration in accordance with yet another embodiment of the present invention;

FIG. 11D shows a rear side view of the casing of FIG. 11C;

FIG. 12A shows a schematic diagram (plan view) of the casing of FIG. 11A in an open configuration;

FIG. 12B shows a read side view of the casing of FIG. 12A;

FIG. 12C shows a cross sectional view of a connection portion between the frame and the cover of the casing of FIG. 12A in accordance with one embodiment of the present invention;

FIG. 12D shows a cross sectional view of a connection portion between the frame and the cover of the casing of FIG. 12A in accordance with another embodiment of the present invention;

FIG. 21A shows a schematic diagram of the LED configuration as shown in FIG. 20A when the first LED is lit;

FIG. 21B shows a schematic diagram of the LED configuration as shown in FIG. 20A when two LEDs are lit;

FIG. 21C shows a schematic diagram of the LED configuration as shown in FIG. 20A when three LEDs are lit;

FIG. 21D shows a schematic diagram of the LED configuration as shown in FIG. 20A when four LEDs are lit;

FIG. 21E shows a schematic diagram of the LED configuration as shown in FIG. 20A when five LEDs are lit;

FIG. 21F shows a schematic diagram of the LED configuration as shown in FIG. 20A when all the six LEDs are lit;

FIG. 22B shows a schematic diagram of the LED configuration as shown in FIG. 22A when two LEDs of the inner ring are lit;

FIG. 22C shows a schematic diagram of the LED configuration as shown in FIG. 22A when the LEDs of the inner ring and middle ring are lit;

FIG. 22D shows a schematic diagram of the LED configuration as shown in FIG. 22A when all the LEDs of the inner ring, middle ring and outer ring are lit;

FIG. 23B shows a schematic diagram illustrating the lighting sequence of the LEDs of the LED configuration as shown in FIG. 20A when the battery is switched on;

DETAILED DESCRIPTION OF THE PREFERRED EMBODIMENT

Figures 1A, 1B:
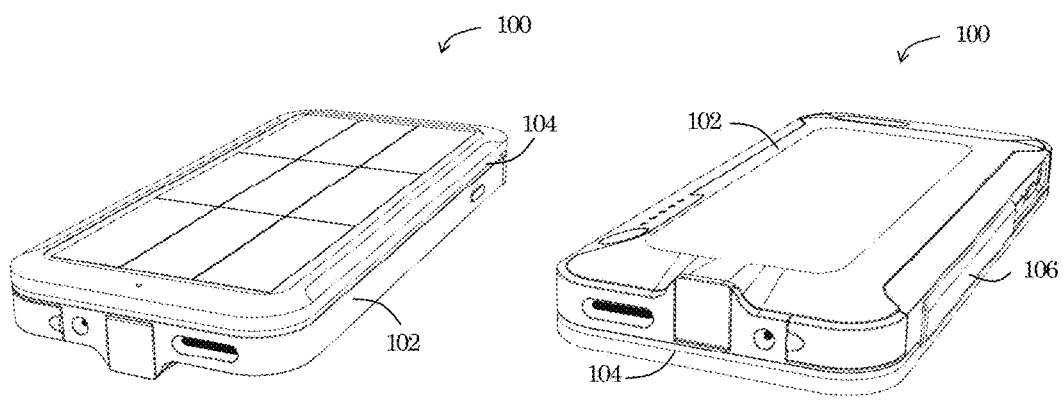
FIG. 1A shows a perspective view of a casing for an electronic device in accordance with one embodiment of the present invention.
FIG. 1B shows an alternative perspective view of the casing of FIG. 1A.

Referring to FIG. 1A-1B, there is shown a casing 100 for an electronic device, comprising a frame 102 having first electrical port arranged to receive a removable solar panel member, and a power storage module arranged for storing energy for use by the electrical device; wherein the power storage module is arranged to receive energy from the solar panel member when the solar panel member is connected to the first electrical port. Preferably, the solar panel member is in the form of a cover 104.

FIGS. 1A and 1B show a casing 100 for an electronic device in accordance with one embodiment of the present invention. As shown in FIGS. 1A-1B, the casing 100 has a substantially rectangular shape and it comprises a frame 102 and a cover 104 removably coupled with the frame 102. In the present embodiment, the cover 104 includes a flexible connection portion 106 such that that allows the cover 104 to pivot relative to the frame 102 between a closed configuration and an open configuration. Preferably, in the closed configuration as shown in FIGS. 1A-1B, the frame 102 and the cover 104 substantially overlap with each other such that the contour of the rim of the plate-like portion of the cover 104 substantially conforms to the rim of the body of the frame 102. In this manner, the cover 104 and the frame 102 substantially completely encase the electronic device in the casing without exposing the electronic device so as to better protect the electronic device. In one embodiment, the cover 104 and the frame 102 mount flush with each other in the closed configuration. On the other hand, in the open configuration, the cover 104 is pivoted relative to the frame 102 such that at least one surface (e.g., the screen) of the electronic device is exposed for viewing or manipulation by the user.

Figures 2A, 2B:
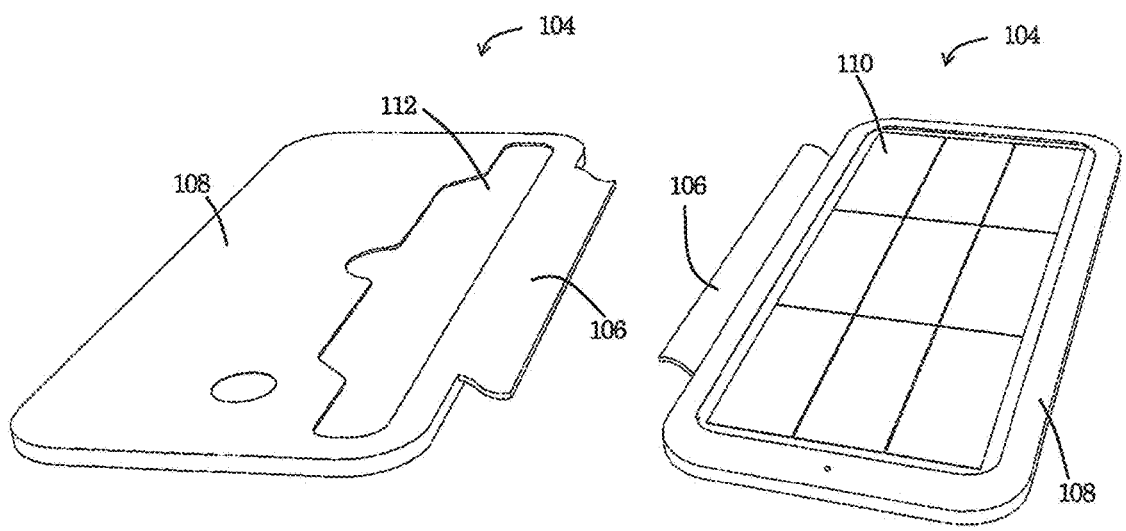
FIG. 2A shows a perspective view of a cover of the casing of FIG. 1A in accordance with one embodiment of the present invention.
FIG. 2B shows an alternative perspective view of the cover of FIG. 2A.

FIGS. 2A and 2B show the cover 104 of the casing 100 in FIGS. 1A and 1B in more detail. As shown in FIGS. 2A and 2B, the cover 104 includes a body with a plate-like portion 108 and a connection portion 106. Preferably, the connection portion 106 is an electrical connection portion that is operable to connect electrically with a corresponding port on the frame 102. In the present embodiment, the connection portion 106 is in the form of a lip that is preferably flexible. A solar panel 110 is mounted on one side of the body of the cover 104 for harnessing solar energy, and converting solar energy into electrical energy. Preferably, a circuit associated with the solar panel 110 is arranged within the body of the cover 104. In one embodiment, a pocket 112 is formed on the other side of the body of the cover 104, and this pocket 112 is arranged for storing objects such as identity card of the user, bank notes, etc.

In this example, FIGS. 2A and 2B illustrates only one example of the many possible applications of the cover 104. In some other alternative embodiments, the cover 104 may be modified or adapted for use as a standalone power source for other electronic or electrical devices. In these examples, the cover 104 could operate as a power source to devices such that the solar energy harnessed by the solar panel 110 can be used as a power source to power up any electronic devices, household appliances, wearable devices, etc or any items not limited to mobile phones but including fans, lights, jewelry, watches, portable electronic equipment, accessories or appliances.

Figures 3A, 3B:
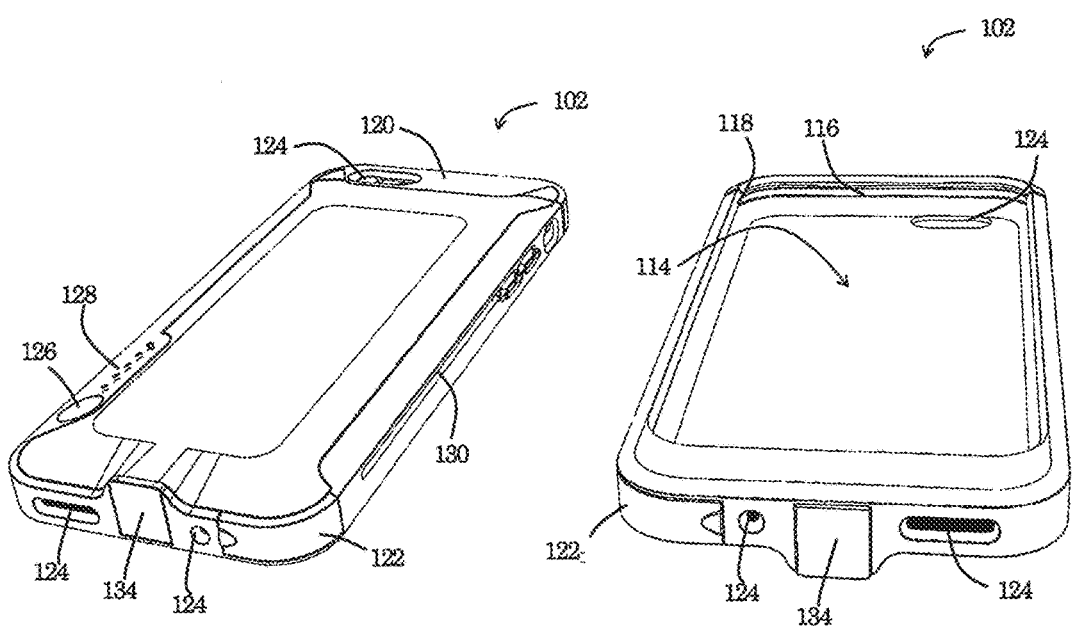
FIG. 3A shows a perspective view of a frame of the casing of FIG. 1A in accordance with one embodiment of the present invention.
FIG. 3B shows an alternative perspective view of the frame of FIG. 3A.
Figure 3C:
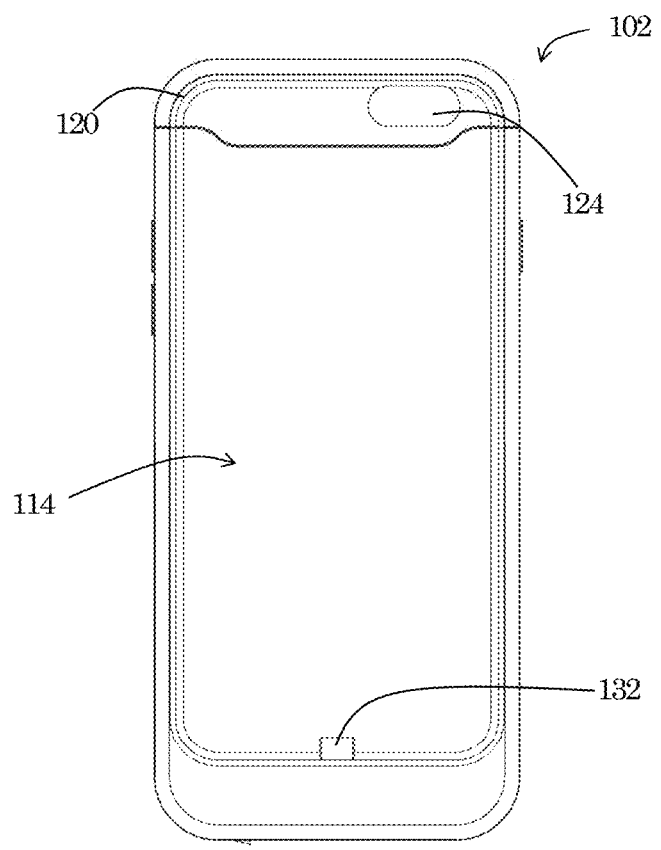
FIG. 3C shows a plan view of the frame of FIG. 3A.

FIGS. 3A to 3C show the frame 102 of the casing 100 in FIGS. 1A and 1B in more detail. As shown in FIGS. 3A to 3C, the frame 102 includes a body that defines a cavity 114 for housing an electronic device. Preferably, the body includes a continuous raised wall portion 116 along its rim for defining the cavity 114. The extension end 118 of the continuous raised wall portion 116 preferably curves inwards so as to firmly retain the electronic device in the cavity 114. In the present embodiment, the body further includes a cap portion 120 that is flexible so that the user can manipulate the cap portion 120 by flexing it relative to the remaining part of the body so as to insert the electronic device into the cavity 114.

Figures 3D, 3E, 3F:
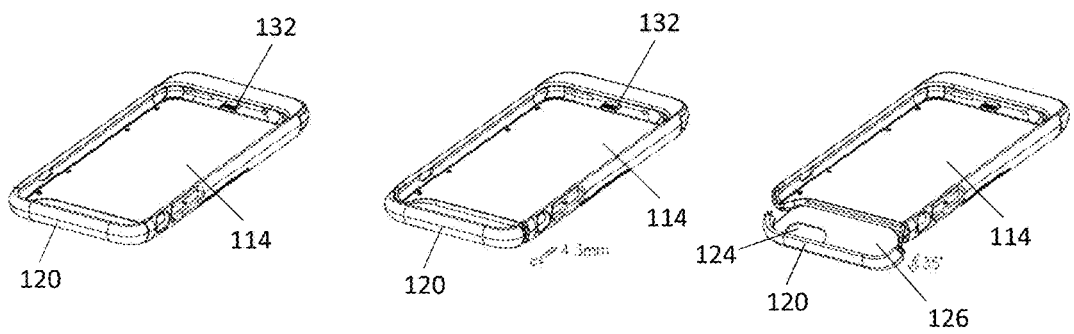
FIG. 3D shows an alternative perspective view of the frame of FIG. 3A.
FIG. 3E shows an alternative perspective view of the frame of FIG. 3A illustrating the cap portion slightly detached from the body.
FIG. 3F shows an alternative perspective view of the frame of FIG. 3A illustrating the cap portion detached from the body.

In the present embodiment as shown in FIGS. 3D to 3F, preferably, the cap portion 120 is at least partially detachable from the body and so as to provide a larger opening such that the electronic device may be inserted into the cavity 114 or removed from the cavity 114 without leaving any undesirable scratches onto the surface of the electronic device, whilst allowing the cap portion 120 to remain engaged to the body at all times. In this example shown in FIG. 3F, the detachable cap portion 120 can be flexed to approximately 35 degrees from the body so as to provide a sizeable opening for the insertion or removal of a smart phone into the cavity 114.

Preferably, the cap portion 120, whilst being detachable from the body, will remain in connected and or engaged with the casing 100. This engagement is, in one example, provided by a tongue member 126 which engage the cap portion 120 at the casing 100. The tongue member 126 may be arranged to be flexible so as to allow the cap portion 120 to be detached from the body while retaining the cap portion 120 near the body and thus avoiding the loss of the cap portion 120 when it is detached from the body for accessing the cavity to house or remove the phone therein. This is advantageous in that the cap portion 120 do not become loose and thus being separated and lost from the body after repeated usage by a user.

In another embodiment of the cover, the cover has a unique profile and shape so as to enhance the aesthetics and grasping feel and ability for the user. As shown in FIG. 3G, there is illustrated this embodiment of the cover. In this embodiment, a left view of this cover has a specifically defined top curvature of the rear side of the casing which enhances the look and tactile feel of the cover. In FIG. 3H, there is shown a cross section view of the present cover which illustrates the curvature of the edges. These curvatures enhance the appearance and feel of the casing when manipulating by the user.

Figure 3I:
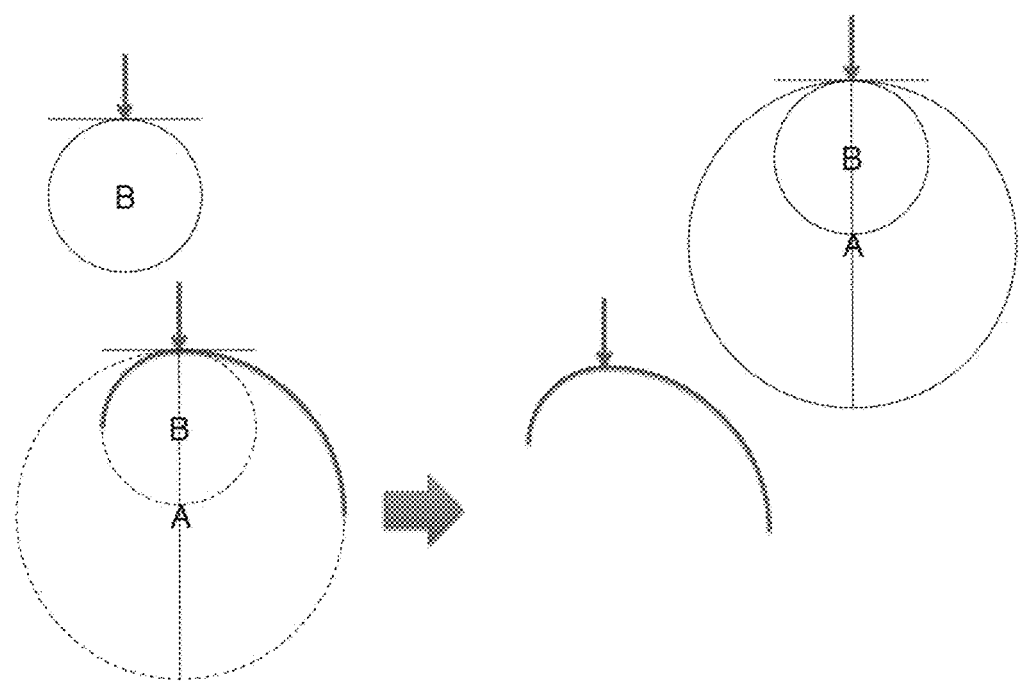
FIG. 3I shows the geometry for deriving the profile and edges shown in FIGS. 3G-3H.

Specifically, these curvatures of the cover as shown in FIGS. 3G and 3H are derived from the geometry as shown in FIG. 3I. In FIG. 3I, it is shown that the geometry resulting in the configuration of the desired curvature which includes the specific curvature of the rear side of the casing as being formed by two curves meeting at co-tangents, that is, where a line is perpendicular to both circle's radii (with two different radii) and rests right on the edge of the two circles such that the overall curvature of the rear part of the frame 102 would be continuous in nature. This unique curvature forms a continuous and smooth feel for the user when upon the user grasps the cover. The curvature also as well as adds to the protection of the phone and ergonomics when the phone is being held by the user to enhance user experience.

Preferably, a jack plug 122 arranged to be inserted into a corresponding jack of the electronic device is integrated with the body of the frame 102. In one embodiment, the jack plug 122 is an audio jack plug for inserting into a corresponding audio jack of the electronic device. In one embodiment, the jack plug 122 can be pulled out from the body of the frame 102 and rotated with respect to the body. A number of through-holes 124 are preferably formed on the body of the frame 102 in positions that correspond to a position of a camera, a port, a plug, and/or one or more buttons of the electronic device, so as to minimize interference to the operation of the electronic device when the device is arranged in the casing 100.

In the present embodiment as shown in FIGS. 3A to 3C, a power storage module comprises one or more rechargeable batteries (not shown) and its associated circuit are arranged within the body of the frame 102. As shown in FIG. 3A, a control button 126 for controlling the operation of the power storage module is arranged on the body of the frame 102. Also, an indicator module 128 comprising a number of LEDs is arranged adjacent the control button 126. The indicator module 128 is preferably arranged to indicate the amount of energy remaining in the one or more rechargeable batteries of the power storage module. In the present embodiment, the frame 102 further includes a first connection port 130 for receiving the connection portion 106 of the cover 104 and hence establishing electrical connection between the solar panel 110 and its associated circuit in the cover 104 with the power storage module and its associated circuit in the frame 102. As best shown in FIG. 3A, the first connection port 130 is in the form of an elongated slot. Also, the frame 102 includes a second electrical connection port 132 for electrically connecting with the electrical device received in the cavity 114 of the frame 102 with the power storage module in the frame, as best shown in FIG. 3C. In this embodiment, the second electrical connection port 132 is in the form of a plug with electrical contacts formed thereon for engaging with a power jack of the electrical device. Preferably, a third electrical connection port 134 for connecting with an external power source, such as an AC mains, through a power cable for electrically connecting the external power source with the power storage module may further be arranged on the body of the frame 102. Optionally, the third electrical connection port 134 may be provided with a cover that is removed or pivoted only when the third electrical connection port 134 is used. Optionally, a headphone jack extension cable (not shown) may be attached to or provided on the frame 102 so that different models of electronic device with different headphone jack positions may be used when the device is received in the frame 102.

Figure 4:
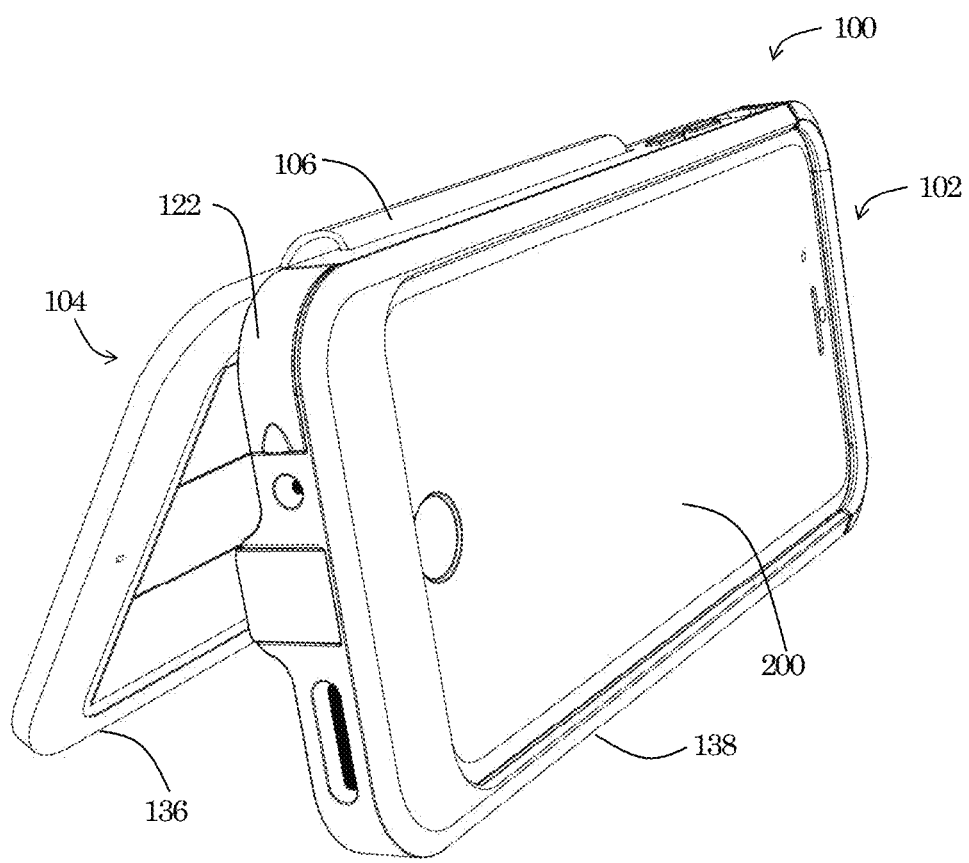
FIG. 4 shows an electronic device arranged in the casing of FIG. 1A, with the casing being in a standing configuration in accordance with one embodiment of the present invention.

FIG. 4 shows an electronic device arranged in the casing 100 of FIG. 1A, with the casing 100 being in a standing configuration in accordance with one embodiment of the present invention. In FIG. 4, the cover 104 is manipulated to pivot relative to the frame 102 such that the plane of the cover 104, and the plane of the frame 102, and the surface of which the casing 100 is resting on, are at an angle with each other to form a triangular shape. In one embodiment, the edges 136, 138 of the body of the cover 104 and/or the body of the frame 102 may be made of a material (e.g., rubber) that provides improved friction with the surface, and the connection portion 106 of the cover 104 may provide additional strength to support the casing 100 in this standing configuration. Optionally, the jack plug member 122 formed integrated with the body of the frame 102 may be rotated to engage with the cover 104 so as to help maintaining the casing 100 in the standing configuration. In this standing configuration, the user can view the screen of the electronic device 200 in a substantially hands-free manner, and can manipulate the screen (e.g., touchscreen) of the electronic device 200 without having to hold onto the electronic device 200.

A person skilled in the art would readily appreciate that the casing 100 illustrated in FIGS. 1A to 4 is only one of the many possible configurations of the casing. For example, in other embodiments, the cover and the frame may have different aesthetic designs (shape, size, form, etc.). For example, the control buttons and the indicator module may be arranged in different positions on the cover; the cover may include more than one solar panels; the indicator module may comprise other display screens or dials in place of the LEDs; etc. In yet another embodiment, the cover may be permanently connected with the frame, i.e., the connection portion of the cover is not detachable from the frame. Also, a person skilled in the art would appreciate that the casing may be made of one or more of: rubber, metal, glass, etc. In some embodiments, the casing may not include all the features illustrated, but only one or more of them. In some other embodiments, the casing may include additional features that are not specifically illustrated in FIGS. 1A to 4.

Figures 5A, 5B:
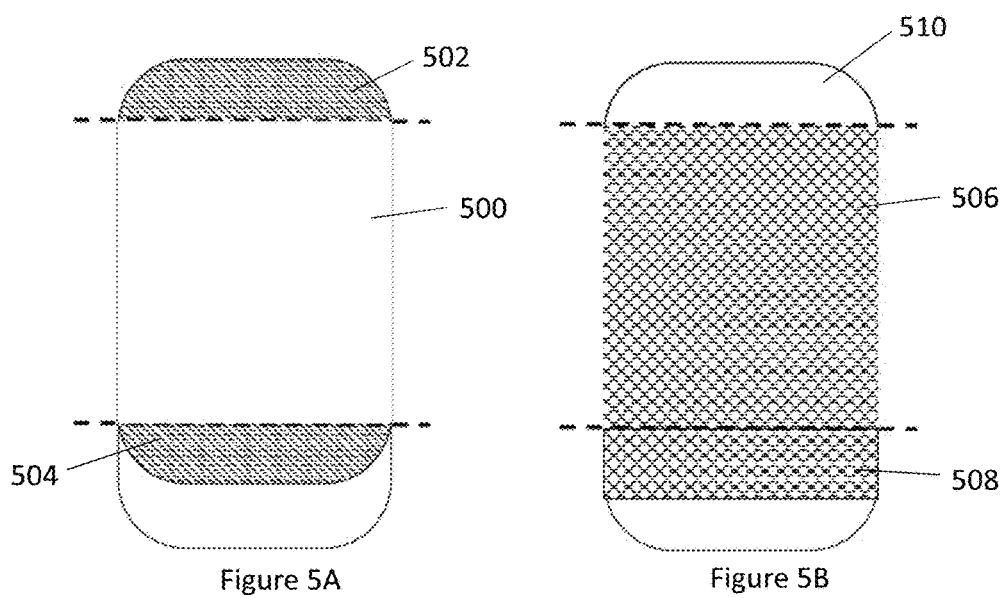
FIG. 5A shows a schematic diagram (plan view) illustrating the sensitive areas of a phone.
FIG. 5B shows a schematic diagram (plan view) illustrating the special arrangement of the solar cell.

In some examples, some smart phones may have signal sensitive areas which if interfered with by placement of a signal blocking member adjacent to these areas may cause a degradation or loss of telecommunication signal transmissions of the phone. In turn, this may result in a lower quality transmission between a phone and a base tower. FIG. 5A shows an example of a signal sending and receiving sensitive area of a smartphone after it has been inserted into a casing 500. FIG. 5B shows the configuration of the solar cells on the solar cover 510 whilst FIG. 5C (the plain front view), FIG. 5D (the rear side view) and FIG. 5E (the right side view) show the resulting configuration of the combination of the solar cover 510 and the phone casing.

Figure 5C:
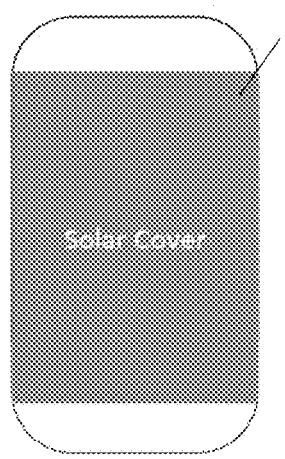
FIG. 5C shows a schematic diagram (plan view) illustrating the resulting assembly of the solar cover.
Figure 5D:
FIG. 5D shows a schematic diagram (side view) illustrating the resulting assembly of the solar cover and the casing.
Figure 5E:
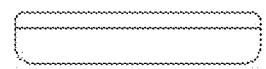
FIG. 5E shows a schematic diagram (top view) illustrating the resulting assembly of the solar cover and the casing.

As shown in FIG. 5A, the uppermost region 502 and lower region 504 of the casing 500 are the areas where the phone may send and receive signals for communication. In some examples, solar panels may generally give certain unfeasible interference to any kind of communicating devices relying on Wi-Fi signals or mobile network signals due to the physical characteristics of the solar panel itself. Accordingly, the uppermost region 502 and lower region 504 may be regarded as highly signal sending and receiving sensitive areas as the phone may not be able to perform its general function should these areas are blocked by any solar panels that may interfere with the signal transmission of the phone. To avoid or minimise the interference by the solar panel, the solar cells may be placed in a special arrangement as shown in FIG. 5B. As shown in FIG. 5B, the solar cover 510 comprises a solar cell panel 506 placed on top of the middle portion of the phone (approximately the LCD screen), and an imitation solar cell panel 508 covering the lower area of the phone. Preferably, the overall appearance of the solar cover would appear to be in one piece as shown in FIG. 5C. These examples may in turn be advantageous in that signal sensitive areas of the phone would not be affected by the deliberate placement of the solar panels, whilst allowing the solar panels to blend in with the surroundings through the use of adjacent imitation panels which do not interfere with telecommunication signal transmission.

FIGS. 6A to 6D are a number of simplified schematic diagrams of a casing for an electronic device in accordance with one embodiment of the present invention. In particular, FIGS. 6A (plan view) and 6B (side view) show the casing 600 in a first closed configuration and FIGS. 6C (plan view) and 6D (side view) show the casing 600 in a second closed configuration. As shown in FIGS. 6A to 6D, in both the first and second closed configurations, the cover 604 and the frame 602 are engaged with each other such that they are mounted substantially flush with each other. In the first closed configuration in FIGS. 6A and 6B, the solar panel 610 of the cover 604 is arranged to face towards the frame 602 such that the solar panel 610 is substantially concealed by the casing 600 in the closed configuration. In the second closed configuration in FIGS. 6C and 6D, the solar panel 610 of the cover 604 is arranged to face away from the frame 602 such that the solar panel 610 is substantially exposed in the closed configuration. FIGS. 6A to 6D illustrate that the cover 604 is reversibly connectable with the frame 602 such that the cover 604 can be connected with the frame 602 with the solar panel 610 exposed (facing upwards in FIG. 6D) or with the solar panel 610 concealed (facing downwards in FIG. 6B).

Figures 6A, 6B, 6C, 6D:
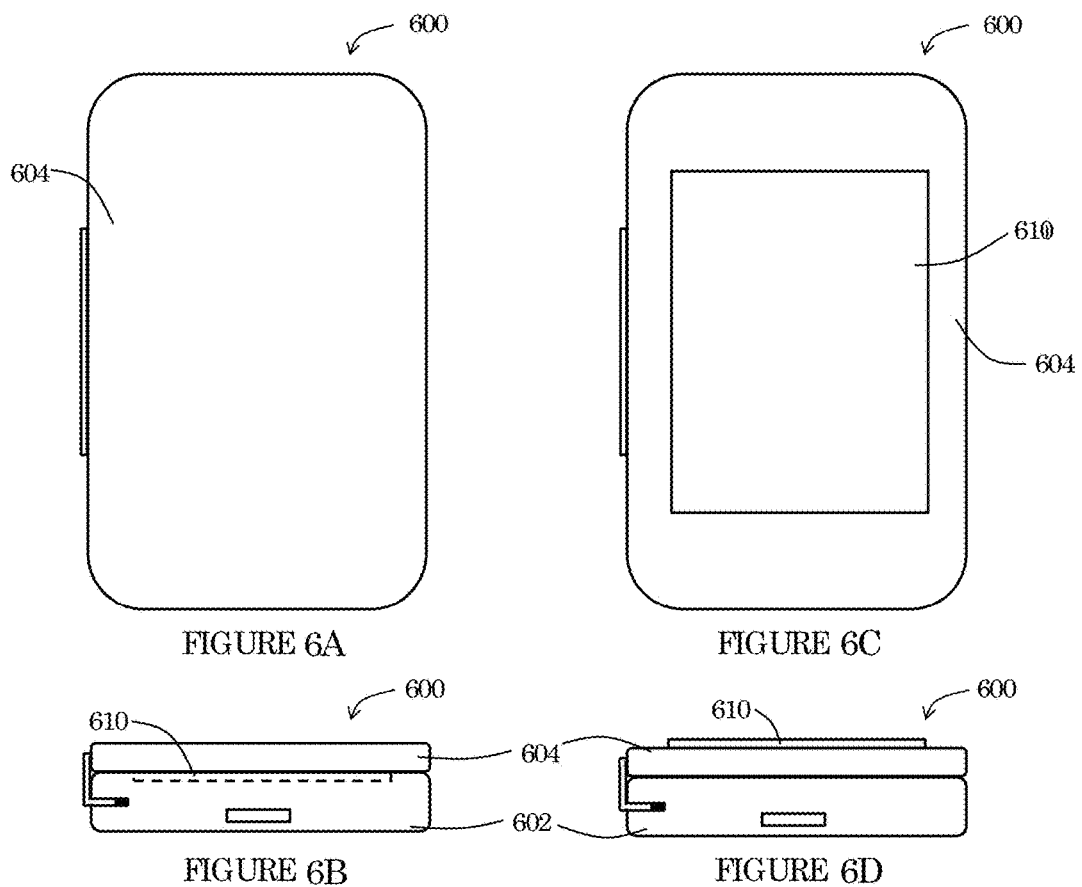
FIG. 6A shows a schematic diagram (plan view) of a casing for an electronic device in a first closed configuration in accordance with another embodiment of the present invention.
FIG. 6B shows a rear side view of the casing of FIG. 6A.
FIG. 6C shows a schematic diagram (plan view) of the casing of FIG. 6A in a second closed configuration in accordance with another embodiment of the present invention.
FIG. 6D shows a rear side view of the casing of FIG. 6C.
Figure 7A:
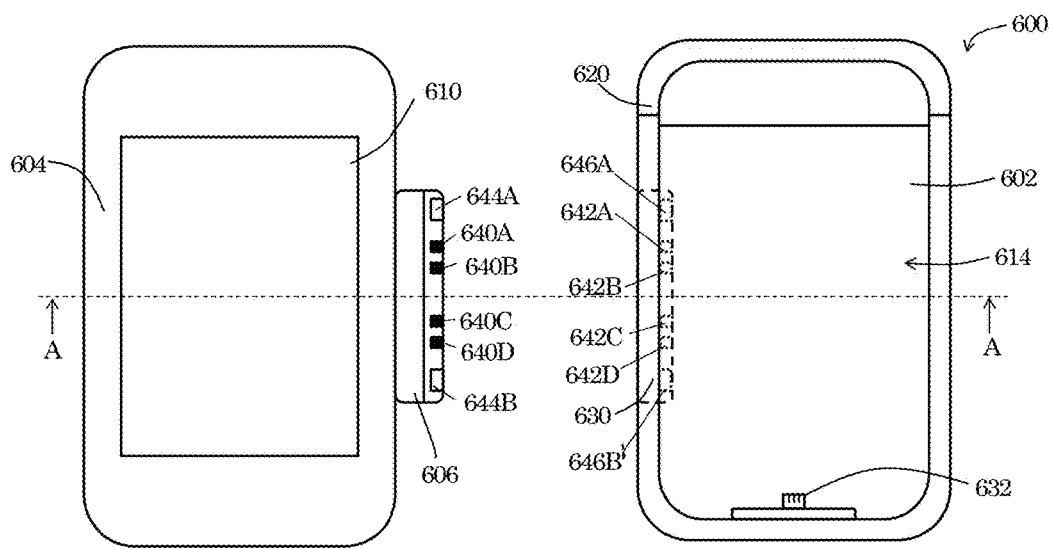
FIG. 7A shows a schematic diagram (plan view) of the casing of FIG. 6A, with the cover disconnected with the frame.
Figure 7B:
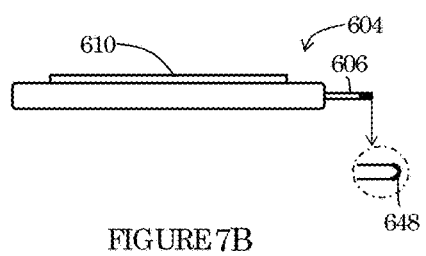
FIG. 7B shows a rear side view of the cover of the casing of FIG. 7A, with a zoom in view of the connection portion of the cover.
Figure 7C:
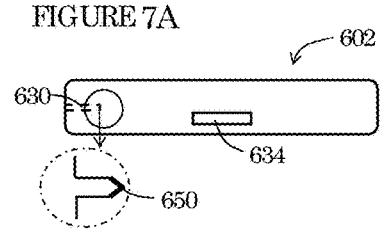
FIG. 7C shows a rear side view of the frame of the casing of FIG. 7A, with a zoom in view of the connection portion of the frame.

FIGS. 7A to 7C show the casing 600 of FIGS. 6A to 6D, with the cover 604 disconnected from the frame 602. As shown in FIG. 7A, the cover 604 includes a body with a connection portion 606. A solar panel 610 is mounted on the body of the cover 604. The frame 602 includes a body that defines a cavity 614 for receiving an electronic device. The body of the frame 602 includes a flexible cap portion 620 arranged to be manipulated for inserting the electronic device into the cavity 614. Preferably, the frame 602 includes a first connection port 630 arranged to receive the connection portion 606 of the cover 604, and hence connecting the cover 604 with the frame 602. The frame 602 further includes a second connection port 632 for connecting with the electronic device housed in a cavity of the frame 602. A third connection port 634 is further arranged in the body of the frame 602 for connecting with an external power source through, for example, a power cable. In the present embodiment, the body (with the connection portion) of the cover 604 and the body of the frame 602 are both shaped to be substantially symmetrical about their transverse axes A-A.

In the present embodiment, the connection portion 606 of the cover 604 and the first connection port 630 of the frame 602 include an electrical arrangement for connecting cover 604 with the frame 602. More specifically, the electrical arrangement is arranged to establish electrical connection of the circuit in the cover 604 with the circuit in the frame 602 such that energy may be transferred from the solar panel and its associated circuit in the cover 604 to the power storage module and its associated circuit in the frame 602 for storage and for use by en electronic device connected with the frame 602. In the present embodiment, the electrical arrangement includes four electrical contacts 640A-640D arranged in the connection portion 606 of the cover 604 and four corresponding electrical contacts 642A-642D arranged in the first connection port 630 of the frame 602. The four electrical contacts 640A-640D arranged in the connection portion 606 includes two positive terminals 640A, 640D and two negative terminals 640B, 640C arranged in two pairs, and the corresponding four electrical contacts 642A-642D arranged in the first connection port 630 includes two corresponding positive terminals 642A, 642D and two negative terminals 642B, 642C arranged in two pairs. Preferably, the four electrical contacts 640A-640D each extend from one side of the connection portion 606 to another side of the connection portion 606 (see FIG. 7B, bolded portion). Likewise, the four corresponding electrical contacts 642A-642D each extend from the upper side of the first connection port 630 to the lower side of the first connection port 630 (see FIG. 7C, bolded portion). This allows the cover 604 to be reversibly connectable with the frame 602. In other words, the electrical connection between the frame 602 and the cover 604 can be established with the cover 604 arranged such that the solar panel 610 faces towards the frame 602 (FIG. 6B), or with the cover 604 arranged such that the solar panel 610 faces away from the frame 602 (FIG. 6D).

Although one pair of electrical contacts would be sufficient for communicating electricity between the cover and the frame, the provision of an additional pair of electrical contacts in the present embodiment provides a redundancy that may be useful when one pair of contacts are not operating properly. In some cases, the energy transfer may be more efficient by having more than one pair of electrical contacts. In a preferred embodiment, the four electrical contacts 640A-640D arranged in the connection portion 606 are disposed symmetrically about a transverse axis A-A of the connection portion 606, and the four corresponding electrical contacts 642A-642D arranged in the first connection port 630 are disposed symmetrically about a transverse axis A-A of the first connection port 630. In other embodiments, other number of electrical contacts may be used.

Preferably, the connection portion 606 of the cover 604 and the first connection port 630 of the frame 602 include a magnetic arrangement for connecting the cover 604 with the frame 602. Preferably, the magnetic arrangement is arranged to maintain the connection of the cover 604 and the frame 602 and to facilitate alignment of the connection portion 606 of the cover 604 with the first connection port 630 of the frame 602 during connection. In the present embodiment, the magnetic arrangement includes two magnet pieces 644A-644B arranged in the connection portion 606 of the cover 604, and two corresponding metal pieces 646A-646B arranged in the first connection port 630 of the frame 602. The magnet pieces 644A-644B and the metal pieces 646A-646B can readily engage with each other through electromagnetic force to hold the connection portion 606 in the first connection port 630. In another embodiment, the magnetic arrangement may include two metal pieces arranged in the connection portion 606 of the cover 604, and two corresponding magnet pieces arranged in the first connection port 630 of the frame 602. In a further embodiment, the magnetic arrangement may include two magnet pieces arranged in the connection portion 606 of the cover 604, and two corresponding magnet pieces arranged in the first connection port 630 of the frame 602.

Figure 7D:
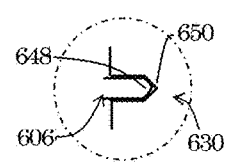
FIG. 7D illustrates the connection between the connection portions of the cover and the frame of FIG. 7A.

FIGS. 7B and 7C illustrate the profile and shape of the connection portion 606 of the cover 604 and the first connection port 630 of the frame 602 respectively. As shown in FIG. 7B, in the present embodiment, the connection portion 606 and hence the electrical contacts 640A-640D arranged in the connection portion 606 of the cover 604 forms a rounded edge 648. On the other hand, as shown in FIG. 7C, in the present embodiment the first connection port 630 and hence the electrical contacts 642A-642D arranged in the first connection port 630 of the frame 602 forms an angled edge 650 that resembles a V shape (albeit rotated anticlockwise by 90 degrees). FIG. 7D illustrates the connection of the connection portion 606 of the cover 604 of FIG. 7B with the first connection port 630 of the frame 602 of FIG. 7C. As shown in FIG. 7D, by having a rounded edge in the connection portion 606 of the cover 604 and an angled edge in the first connection port 630 of the frame 602, a clearance (gap) is formed when the connection portion 606 and the first connection port 630 engages. In the event that dust or other debris are entrained in the first connection port 630, this clearance is advantageous as it provides a space for temporarily holding dust without affecting the electrical connection between the cover 604 and the frame 602. In other words, as the user inserts the connection portion 606 into the first connection port 630, any dust or debris that is entrained in the port 630 of the frame 602 may be pushed towards the end of the port 630 to be held in the clearance (gap), whilst the electrical contacts 640A-640D arranged in the connection portion 606 of the cover 604 may establish at least a two point electrical contact with the corresponding electrical contacts 642A-642D arranged in the first connection port 630 of the frame 602.

FIGS. 8A to 8D illustrates the two sides of the cover 604 of the casings in FIG. 6A to 6D. As shown in FIGS. 8A to 8D, in the present embodiment, only one side of the cover 604 includes a solar panel 610. Also, the electrical contacts 640A-640D are arranged on both sides of the connection portion 606 of the cover 604, which allows the cover 604 to be reversibly connected with the frame 602 without compromising the functionality (e.g., electrical connection with the port 630 of the cover 602) of the cover 604. It should be noted that, however, in other embodiments, one or more solar panels may be formed on one or both sides of the cover 604.

Figure 9A:
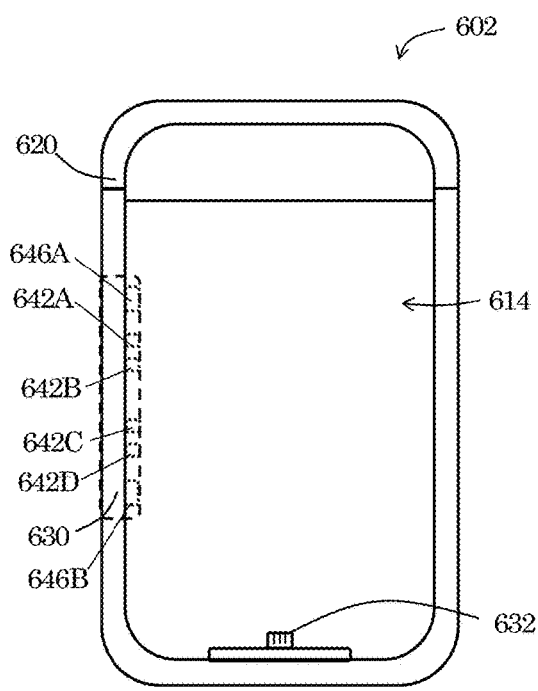
FIG. 9A shows a schematic diagram (plan view) of the frame of the casing of FIG. 7A.
Figure 9B:
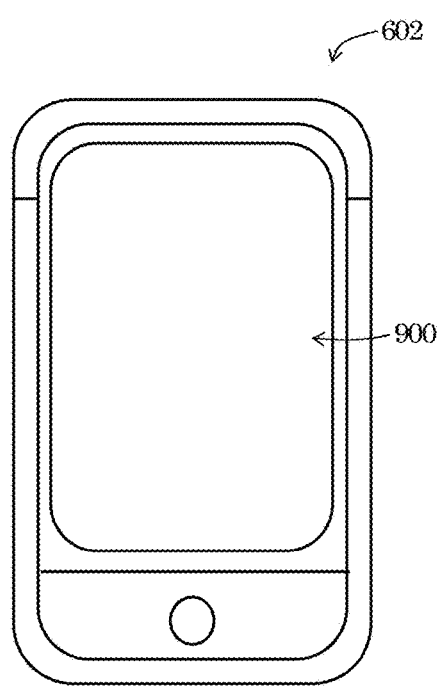
FIG. 9B shows a schematic diagram (plan view) of the frame of FIG. 9A inserted with a phone.

FIGS. 9A and 9B show the frame 602 of the casing of FIGS. 6A to 6D, mounted with (FIG. 9B) or without (FIG. 9A) a portable electronic device such as a mobile phone 900. As shown in FIG. 9B, the portable electronic device 900 is received in the cavity 614 of the frame 602. In this arrangement, the second connection port 632 (in the form of a plug with metal contacts) of the frame 602 is arranged to be received in a corresponding power port of the electronic device 900 so as to enable electrical connection between the power storage module and its associated circuit in the frame 602 with the phone 900, and in particular the battery of the phone.

Figure 10A:
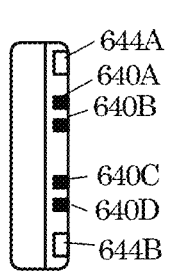
FIG. 10A shows a schematic diagram (plan view) of the connection portion of the cover of the casing of FIG. 7A.
Figure 10B:
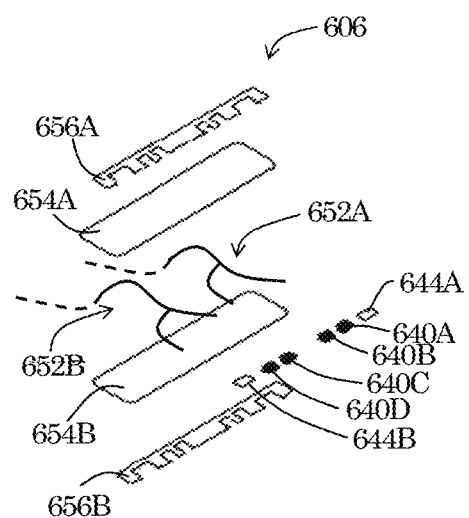
FIG. 10B shows an exploded view of the connection portion of FIG. 10A.

FIGS. 10A and 10B show a plan view and an exploded view of the connection portion 606 of the body of the cover 604 of FIGS. 6A to 6D. As shown in FIGS. 10A and 10B, the connection portion 606 is formed by connection wires 652A-652B extending from the body of the cover 604, two bridge members 654A-654B, two magnet members 644A-644B, four electrical contact clips 640A-640D, as well as two elongated plastic pieces 656A-656B. Preferably, the two connection wires 652A-652B (one positive, one negative) are extending from the solar panel and/or its associated circuit in the cover 604. In the present embodiment, the connection wires 652A-652B and the magnet members 644A-644B are sandwiched between the two bridge members 654A-654B. Preferably, the bridge members 654A-654B are flexible in that they can be bent to a certain extent without breaking. The four electrical contact clips 640A-640D with preferably two positive terminals 640A, 640D and two negative terminals 640B, 640C are arranged to be clipped onto the bridge members 654A-654B whilst connecting electrically with the connection wires 652A-652B. In one embodiment, the middle two electrical contact clips 640B, 640C of the same polarity so that they may be formed as one, resulting in a total of three electrical contact clips. In other embodiments, the order of polarities of the electrical contact clips may be different. Preferably, the electrical contact clips 640A-640D are arranged to provide a rounded edge 648 as illustrated in FIG. 7B. The two elongated plastic pieces 656A-656B include cut-outs that correspond to the positions of the electrical contacts 640A-640D and the magnet pieces 644A-644B are arranged to be snapped over and adhered to the edge of the connection portion 606 such that only the electrical contacts 640A-640D are exposed when assembled (the magnet members 644A-644B are preferably sandwiched between the two bridge members 654A-654B).

A person skilled in the art would readily appreciate that the casing 600 illustrated in FIGS. 6A to 10B only illustrates some of the key features of the casing 600 in this embodiment. In other words, for simplicity, some structural and functional details of the casing 600 have been omitted from the Figures. Again, variations of the casing 600 of the present embodiment are possible. For example, the magnetic arrangement in the connection portion 606 of the cover 604 and in the first connection port 630 of the frame 602 may include any number of magnet and metallic members. In other embodiments, the magnetic arrangement may be replaced with other mechanical arrangements such as mechanical latches or locks. As another example, the rounded edge 648 of the connection portion 606 of the cover 604 and the angled edge 650 of the first connection port 630 of the frame 602 may be arranged oppositely such that the rounded edge are arranged in the first connection port and angled edge is arranged in the connection portion. Alternatively, the angled portion may not be V shape, but may be any shape formed with any number of lines with sharp edges.

FIGS. 11A to 12C are a number of simplified schematic diagrams of a casing 1000 for an electronic device in accordance with one embodiment of the present invention. The casing 1000 in this embodiment is substantially similar to that of the previous embodiments in FIGS. 6A to 10B. In particular, the casing 1000 in this embodiment also includes a cover 1004 with a solar panel 1010, and a frame 1002. The only main difference between the casing 1000 in the present embodiment and the casing 600 in the embodiment of FIGS. 6A-10B is that the cover 1004 and the frame 1002 in the present embodiment are permanently connected with each other with a hinge portion 1006. As shown in FIG. 12A, in the present embodiment, the hinge portion 1006 may provide a rotation axis B-B along the longitudinal direction of the cover 1004 or the frame 1002 such that the cover 1004 may be pivoted to manipulate the casing 1000 between open and closed configurations. In one embodiment, the hinge portion 1006 may provide a further rotation axis C-C along the transverse direction of the cover 1004 or the frame 1002 such that the cover 1002 can be flipped over about the transverse axis C-C. In other words, in the present embodiment, the cover 1004 may still be flipped over to expose or conceal the solar panel 1010, mimicking the effect that the cover 604 is reversibly connectable with the frame 602 as illustrated in FIGS. 6A to 10B. FIGS. 12C and 12D show the cross sections of the two embodiments of the hinge portion 1006 respectively. In FIG. 12C, the hinge portion 1006A includes a substantially rectangular cross section, with the electrical connections (e.g., wires) arranged within a rectangular core of the hinge portion. In FIG. 12D, the hinge portion 1006B includes a substantially circular cross section, with the electrical connections (e.g., wires) arranged within a circular core of the hinge portion.

Figure 13:
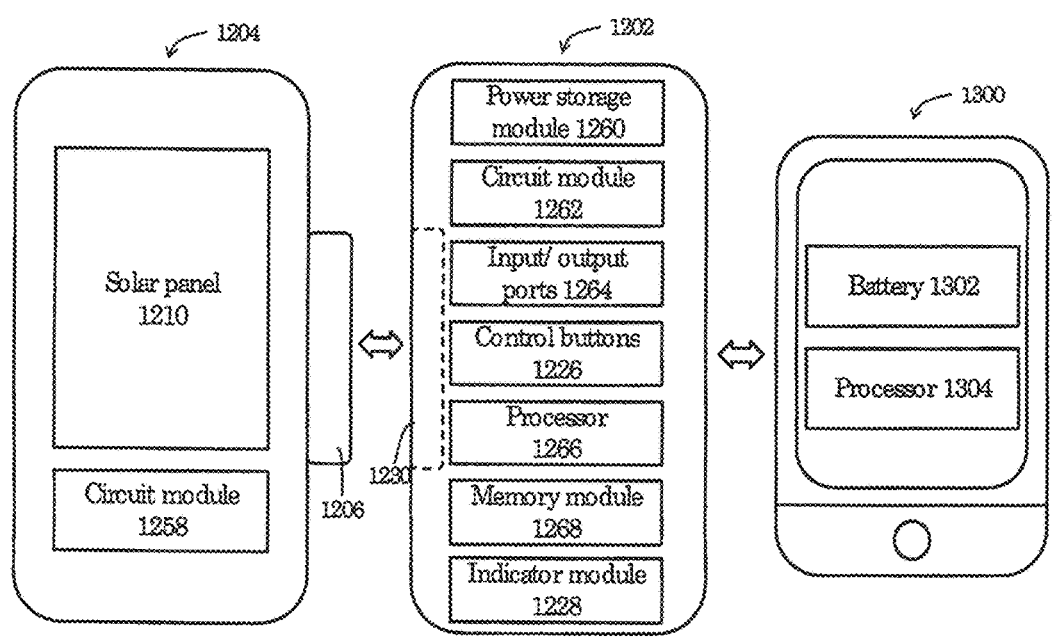
FIG. 13 is a functional block diagram illustrating the main function modules of a casing for an electronic device and an electronic device to be housed in the casing, as well as the connections between the casing and the electronic device in accordance with one embodiment of the present invention.

FIG. 13 is a functional block diagram illustrating the main function modules of a casing 1202, 1204 for an electronic device 1300, and an electronic device 1300 to be housed in the casing 1202, 1204, as well as the connections between the casing 1202, 1204 and the electronic device 1300 in accordance with one embodiment of the present invention. As shown in FIG. 13, the casing includes a cover 1204 and a frame 1202 removably connected with each other. In the present embodiment, the cover 1204 includes a solar panel 1210 arranged to harness solar energy and convert solar energy into electrical energy. A circuit 1258 associated with the solar panel 1210 is also arranged in the cover 1204. Preferably, the cover 1204 includes a connection portion 1206 for establishing mechanical and electrical connections with the frame 1202. In one embodiment, the cover 1204 may collect and hence store light/solar energy independent of whether it is connected with the frame 1202.

In the present embodiment, the frame 1202 is arranged to receive an electronic device 1300, preferably a portable electronic device such as a mobile phone or a tablet computer. Functionally, the frame 1202 includes a power storage module 1260 for storing electrical energy. The power storage module 1260 in the present embodiment includes one or more rechargeable batteries. A circuit module 1262 associated with the power storage module 1260 is also arranged in the frame 1202. The frame 1202 further includes a number of input/output ports 1264. These input/output ports 1264 include a first electrical port 1230 arranged to receive the removable cover 1204, a second electrical port arranged to connect with an electronic device 1300 (when the electronic device 1300 is received in the frame 1202), and a third electrical port arranged to connect with an external power source. In the present embodiment, when the connection portion 1206 of the cover 1204 is connected to the first electrical port 1230 of the frame 1202, the power storage module 1260 is arranged to receive energy from the solar panel 1210 and its associated circuit 1258. Also, when the electronic device 1300 is connected with the second electrical port, the power storage module 1260 is arranged to supply energy to the battery 1302 in the electronic device. The processor 1304 in the electronic device 1300 may be arranged to regulate this process. When an external power source is connected to the third electrical port, the power storage module 1260 is arranged to receive energy from the external power source. In the situation where the electronic device 1300 and the external power source are both connected to the frame 1202, the power storage module 1260 is arranged to simultaneously receive energy from the external power source and supply energy to the electronic device 1300. Preferably in this case, the power storage module 1260 supplies all the power available from the external power source to the electronic device 1300 without storing any of the energy before the electronic device 1300 is substantially fully charged.

The frame 1202 of the casing may further includes one or more control buttons 1226 actuable by the user to control the operation of the power storage module 1260 and hence the associated circuit module 1262. For example, the user may press the control button 1226 on the casing to activate or deactivate the operation of the power storage module 1260 to enable or disable electrical connection between the power storage module 1260 and the electronic device 1300. The frame 1202 preferably includes a processor 1266 and a memory module 1268 for controlling and/or monitoring the operation of the power storage module 1260 and the associated circuit 1262. The memory module 1268 preferably stores program instructions for operating the power storage module 1260 based on the input from the control buttons 1226 or from the input/output ports 1264. In the present embodiment, the frame 1202 further includes an indicator module 1228 for indicating the status of the power storage module 1260. For example, the indicator module 1228 may be one or more LEDs arranged to indicate the energy remaining in the power storage module 1260.

Figure 14:
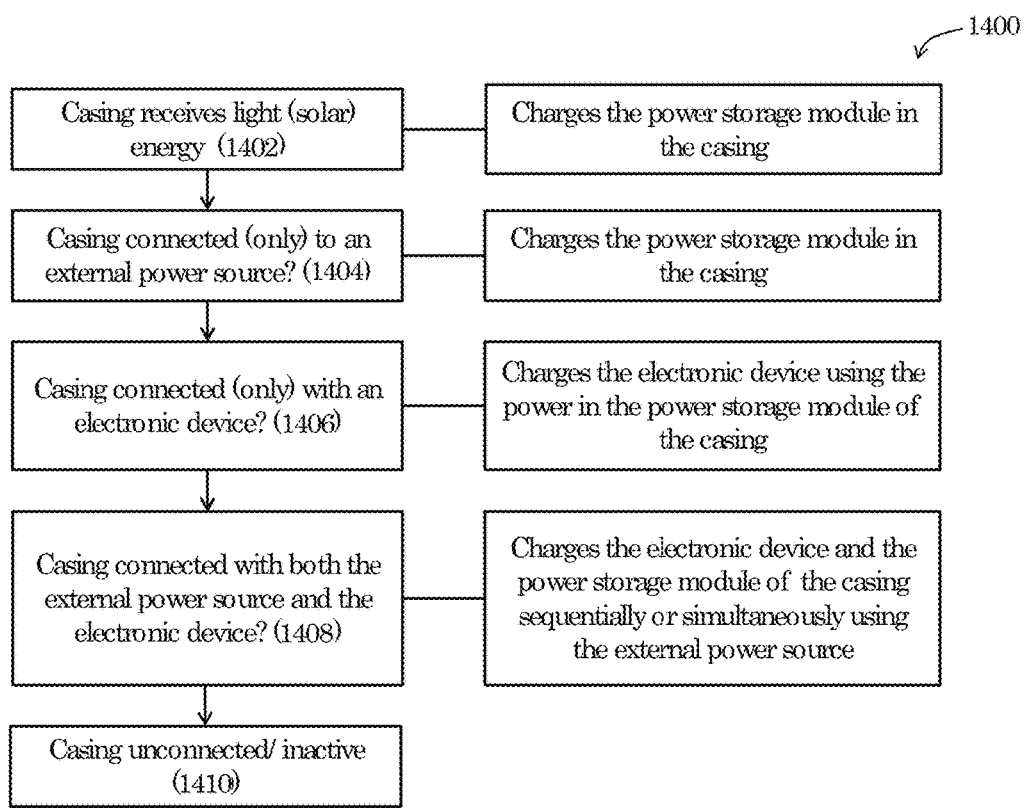
FIG. 14 is a flow diagram showing the general operation of the casing (the cover connected with the frame) of FIG. 13 in accordance with one embodiment of the present invention.

FIG. 14 shows a flow diagram 1400 of the general operation of the casing (the cover connected with the frame) of FIG. 13 in accordance with one embodiment of the present invention. In step 1402, if the casing (the cover member) detects and receives solar energy, the power storage module in the casing is charged using the solar energy. In step 1404, if only an external power source is connected with the casing, the power storage module in the casing is charged using the power provided by the external power source. If light energy is also available to the casing in step 1404, then the power storage module may also be charged using the solar energy. In other words, the power storage module may be charged using solar energy and energy provided by the external power source at the same time. In step 1406, if only an electronic device is connected with the casing, the power storage module will provide power to charge the battery of the electronic device. In one embodiment, when the battery of the electronic device is fully charged, the power storage module (assuming there is energy remaining) contiguous to supply energy to the electronic device, for example, in the form of a trickle charge regime. If light energy is also available to the casing in step 1406, then the power storage module may be charged using the solar energy whilst providing energy to the device. In step 1408, if both the external power source and the electronic device are connected with the casing, then the electronic device and the power storage module of the casing may be charged sequentially or simultaneously by the external power source. In a preferred embodiment, the power storage module does not store any energy provided from the external power source until the electronic device is substantially fully charged. Again, in step 1408, if light energy is also available to the casing, then the power storage module may be charged using the solar energy as well. In step 1410, the casing, which does not receive light energy, and is not connected with an external power source or an external electronic device, may remain in an inactive state. The functional modules in the casing may be in reduced operation mode (hibernation mode, reduced power mode, or off) in this inactive state.

Figure 15:
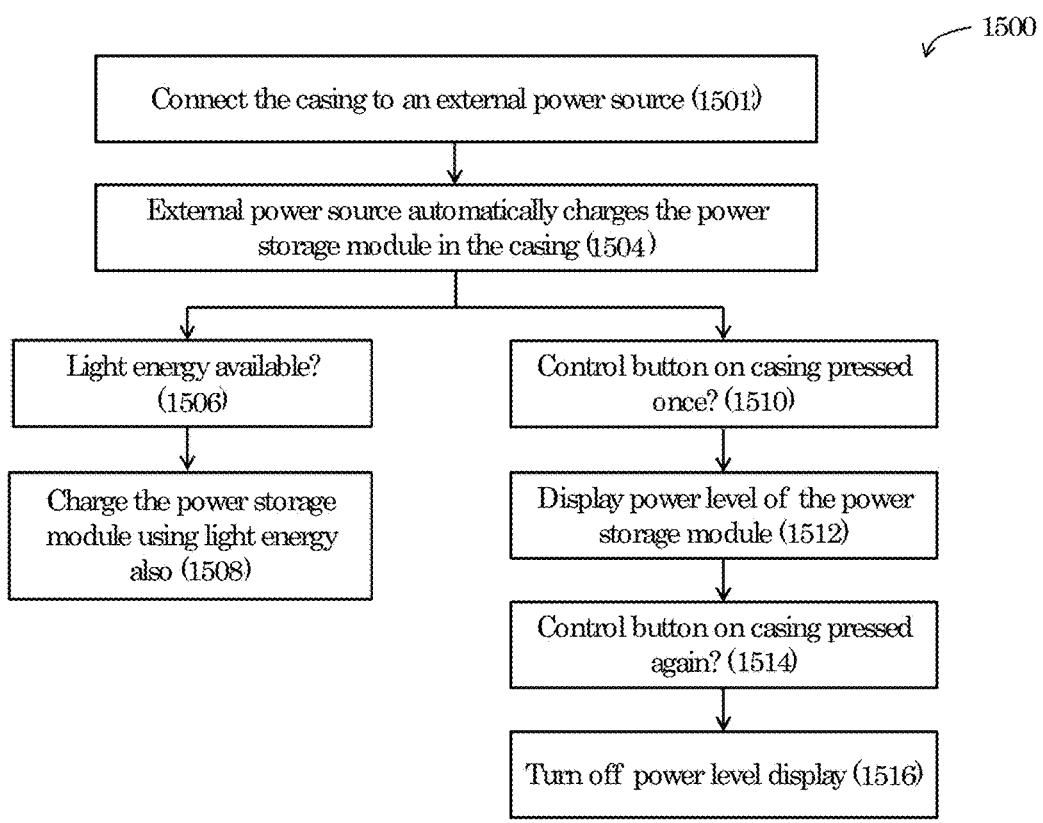
FIG. 15 is a flow diagram showing the operation of the casing (the cover connected with the frame) of FIG. 13 when connected with an external power source in accordance with one embodiment of the present invention.

FIG. 15 is a flow diagram 1500 showing the operation of the casing (the cover connected with the frame) of FIG. 13 when connected with an external power source in accordance with one embodiment of the present invention. As shown in FIG. 15, in step 1502, an external power source is connected with the casing. Subsequently, in step 1504, the external power source may automatically charge the power storage module in the casing. In step 1506, if light (solar) energy is available to the casing, the casing will charge the power storage module using light energy at the same time as it is being charged by the external power source, as in step 1508. In step 1510, if during charging the control button is pressed once by the user, the casing will then, in step 1512, display the power level of the power storage module using the indicator module. For example, the indicator module includes a number of LED lights, and the power level of the power storage level may be indicated by the number of LED lights that are lit. In step 1514, if the user then presses the control button again, then the indicator module will be turned off, as in step 1516.

Figure 16:
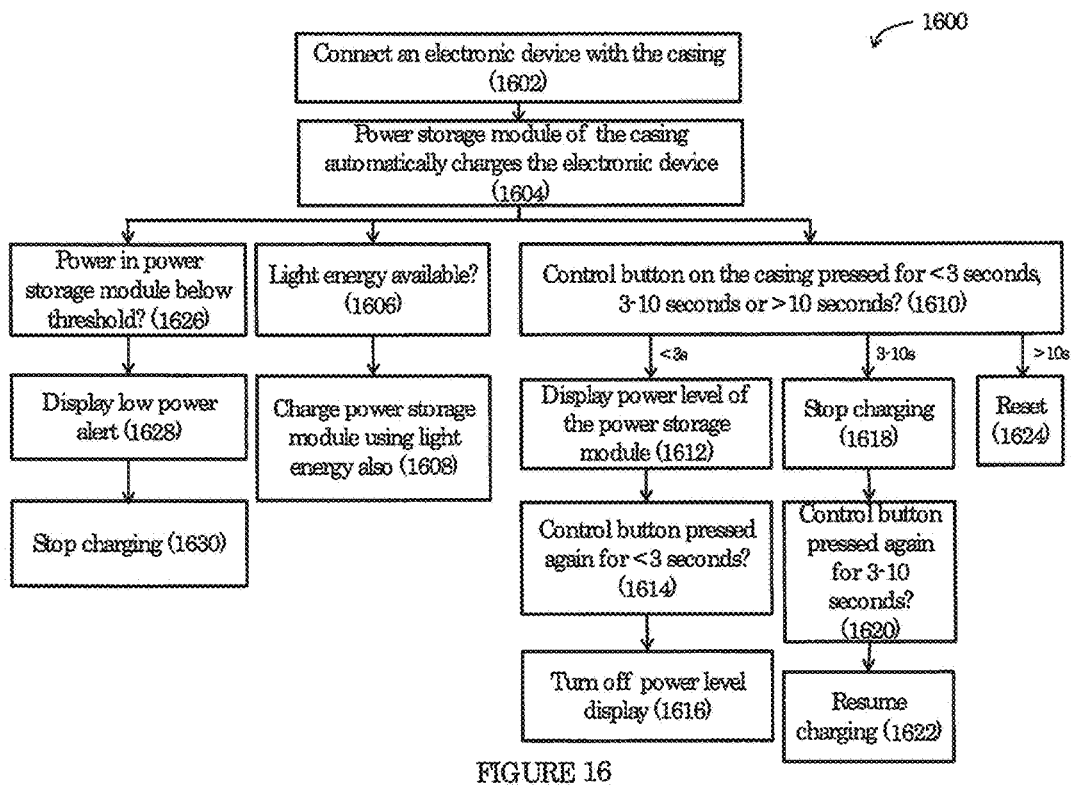
FIG. 16 is a flow diagram showing the operation of the casing (the cover connected with the frame) of FIG. 13 when connected with an electronic device in accordance with one embodiment of the present invention.

FIG. 16 is a flow diagram 1600 showing the operation of the casing (the cover connected with the frame) of FIG. 13 when connected with an electronic device in accordance with one embodiment of the present invention. As shown in FIG. 16, in step 1602, an electronic device is connected with the casing. Subsequently, in step 1604, the power storage module in the casing then automatically charges the electronic device. In step 1606, if light (solar) energy is available to the casing, the casing will charge the power storage module using light energy at the same time as it charges the electronic device, as in step 1608. In step 1610, if the control button on the casing is pressed once during this process for less than 3 second, between 3 to 10 seconds, or more than 10 seconds, then the following events may be triggered. In step 1612, if the control button is pressed once for less than 3 seconds, then the casing will display the power level of the power storage module using the indicator module. For example, the indicator module includes a number of LED lights, and the power level of the power storage level may be indicated by the number of LED lights that are lit. In step 1614, if the user then presses the control button again for less than 3 seconds, then the indicator module will be turned off, as in step 1616. Alternatively, if the control button is pressed once for 3 to 10 seconds, the power storage module will stop supplying power to the electronic device, as in step 1618. In step 1620, if the user then presses the control button again for 3 to 10 seconds, the power storage module will resume supplying power to the electronic device, as in step 1622. If the control button is pressed once for more than 10 seconds in step 1624, then the casing will be reset. This reset of the casing may be done, for example, by restarting the processor in the casing. During charging, if the power in the power storage module falls below a threshold value (e.g., 5% of the overall charging capacity) in step 1626, the indicator module of the casing may display a lower power alert, for example, by flashing one or more of the LEDs in step 1628. The charging will be terminated subsequently in step 1630.

Figure 17:
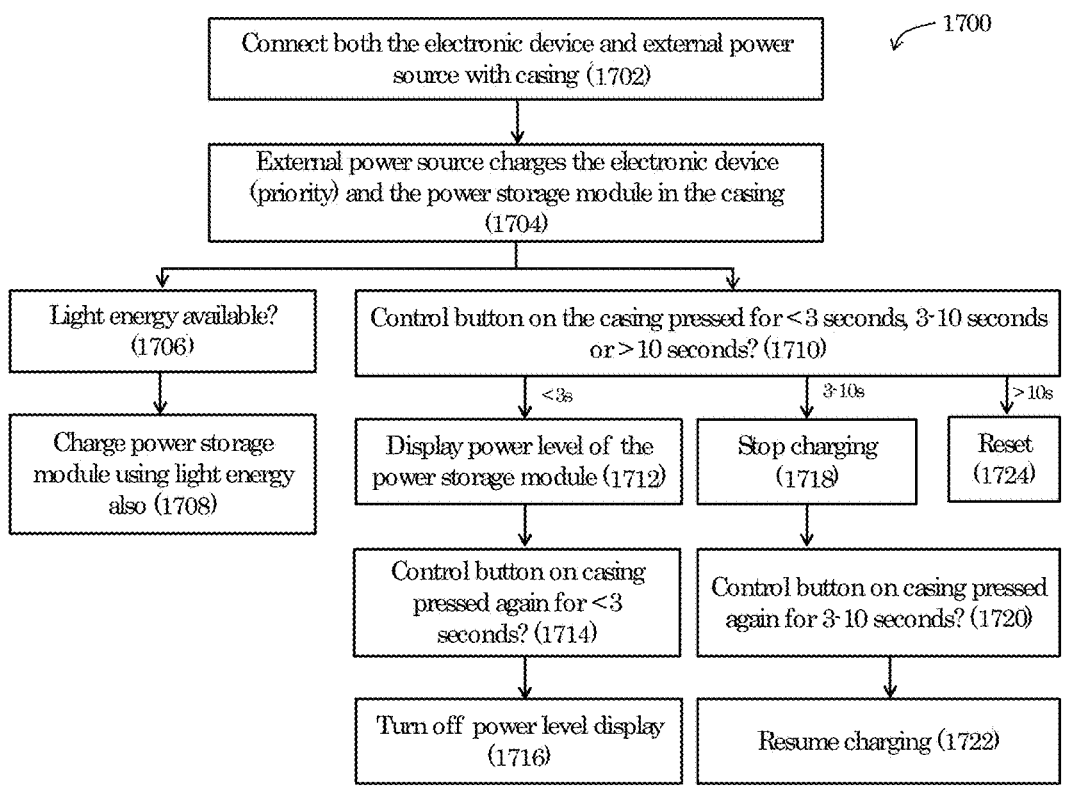
FIG. 17 is a flow diagram showing the operation of the casing (the cover connected with the frame) of FIG. 13 when connected with both an external power source and an external device in accordance with one embodiment of the present invention.

FIG. 17 is a flow diagram 1700 showing the operation of the casing (the cover connected with the frame) of FIG. 13 when connected with both an external power source and an external device in accordance with one embodiment of the present invention. As shown in FIG. 17, in step 1702, an electronic device is connected with both the casing and the external power source. Subsequently, in step 1704, the external power source then automatically charges power storage module in the casing and the electronic device (also through the power storage module). In step 1706, if light (solar) energy is available to the casing, the power storage module will be charged using light energy at the same time as it is charged by the external power source, as in step 1708. In step 1710, if the control button on the casing is pressed once for less than 3 second during this process, between 3 to 10 seconds, or more than 10 seconds, then the following events may be triggered. In step 1712, if the control button is pressed once for less than 3 seconds, then the casing will display the power level of the power storage module using the indicator module. For example, the indicator module includes a number of LED lights, and the power level of the power storage level may be indicated by the number of LED lights that are lit. In step 1714, if the user then presses the control button again for less than 3 seconds, then the indicator module will be turned off, as in step 1716. Alternatively, if the control button is pressed once for 3 to 10 seconds, the power storage module will stop supplying power to the electronic device, as in step 1718. During this period, the external power source may continue to supply energy to the power storage module for storage. In step 1720, if the user then presses the control button again for 3 to 10 seconds, the power storage module will resume supplying power to the electronic device, as in step 1722. If the control button is pressed once for more than 10 seconds in step 1724, then the casing will be reset. This reset of the casing may be done, for example, by restarting the processor in the casing.

Figure 18:
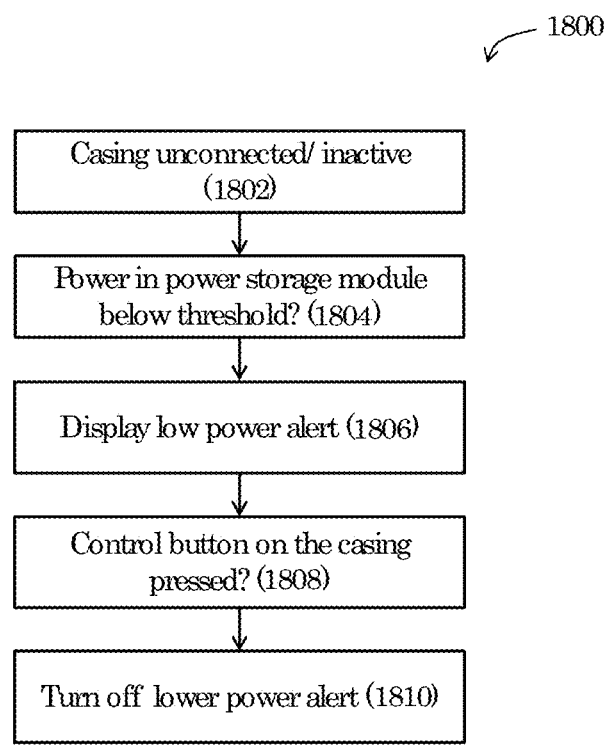
FIG. 18 is a flow diagram showing the operation of the casing (the cover connected with the frame) of FIG. 13 in an inactive state in accordance with one embodiment of the present invention.

FIG. 18 is a flow diagram 1800 showing the operation of the casing (the cover connected with the frame) of FIG. 13 in an inactive state in accordance with one embodiment of the present invention. In FIG. 18, in step 1802, the casing is in an unconnected/inactive state in which both of the external power source and the electronic device is disconnected with the casing, and the casing cannot receive any light energy. In step 1804, the casing determines the power in the power storage module falls below a threshold value (e.g., 5% of the overall charging capacity), the indicator module of the casing may display a lower power alert, for example, by flashing one or more of the LEDs in step 1806. The flashing of the LEDs may continue until the user presses the control button on the casing in step 1808. If the user presses the control button on the casing, the lower power alert can then be turned off, as in step 1810. In other words, the LEDs may stop flashing as a result.

A person skilled in the art would readily appreciate that the functional steps recited in FIGS. 14-18 are only one of the many possible ways of how the casing can operate. For simplicity, some structural and functional details of the casing have been omitted from the Figures. Again, variations of the casing in this embodiment are possible. For example, the solar charging of the power storage module may not be performed when the external power source is connected or when the electronic device is connected. As another example, the control button need not be pressed for 3 second, between 3 to 10 seconds, and more than 10 seconds in order to display the power level, terminate charging and reset the casing processor respectively. Rather, in some embodiments, other time intervals may be used. In one embodiment, instead of relying on the duration of which the button is pressed to differentiate the different events, the control may be based on the number of times of which the control button is toggled. For example, by pressing the button once, the power level of the power storage module will be displayed; by pressing the button twice, charging will be terminated; by pressing the button three times, the casing will be reset. As a further example, the low power alert may take any other form Instead of flashing the LEDs in the indicator module, the LEDs may be turned on permanently, or an LED of different colour (e.g., red) may light up.

Figure 19A:
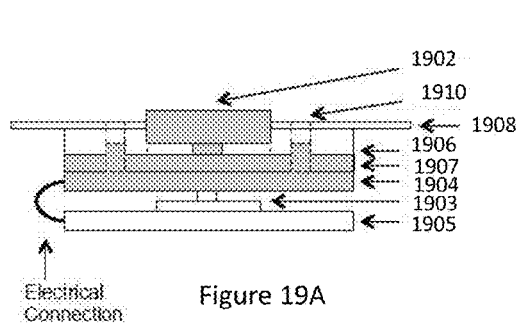
FIG. 19A shows a schematic diagram of the OLED lighting assembly before the button is pressed in accordance with one embodiment of the present invention.
Figure 19B:
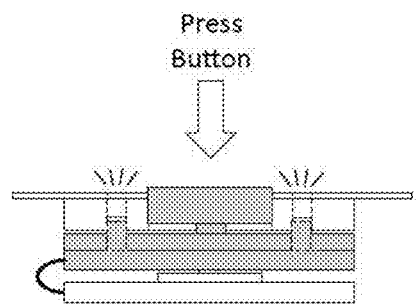
FIG. 19B shows a schematic diagram of the OLED lighting assembly after the button is pressed in accordance with one embodiment of the present invention.

With reference to FIGS. 19A and 19B, there is shown an example of a user manipulable interface for a device such as, but not limited to, a casing for an electronic device. In this example embodiment, the user manipulable interface for a device is an OLED lighting assembly 1900 in accordance with one embodiment of the present invention.

In one embodiment, once the actuating button 1902 is arranged to be pressed by a user, a control module is arranged to issue commands as well as to control an animated lighting module so as to provide feedback to the commands or status of the device based on the manner in which the actuating button was manipulated by the user. In this embodiment, once the SMT button 1903 is triggered and the OLED screen 1904 in electrical connection with a PCBA 1905 is electrically activated such that a programmed pattern is displayed on the OLED screen 1904 via a lit display. The display pattern may match the pattern of the top and bottom lenses 1906 and 1907 and in turn become visible on the product surface 1908.

In this example, the top lens is fixed to the inner product surface 1908 while the bottom lens is fixed to the OLED 1904 upper surface. Two lens pins 1910 disposed on the two sides of the lighting assembly 1900 act like a fiber optics cable, which channeling the light from the OLED screen 1904 through the bottom lens 1907 and then the top lens 1906. Once the button 1902 is pressed, the top lens 1906, the bottom lens 1907 and the OLED screen 1904 move downwards towards the PCMA. Examples of this OLED lighting assembly as shown in FIGS. 19A and 19B may be used to implement the LED lighting configuration of FIGS. 20A to 23B to give an intuitive LED indication for the user.

Figure 20A:
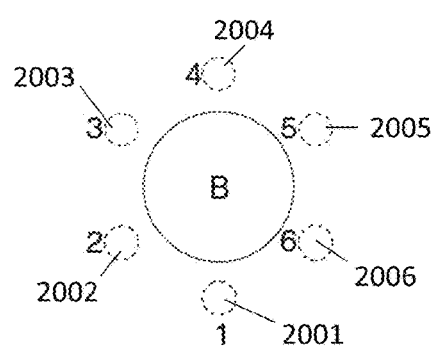
FIG. 20A shows a schematic diagram of the LED configuration in accordance with one embodiment of the present invention.
Figure 20B:
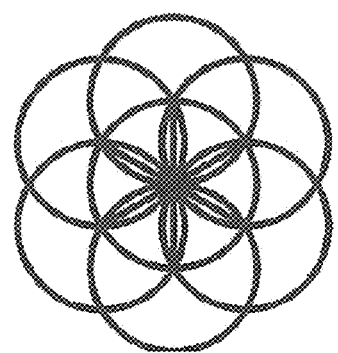
FIG. 20B shows a schematic diagram of the geometry in deriving the LED configuration as shown in FIG. 20.
Figure 22A:
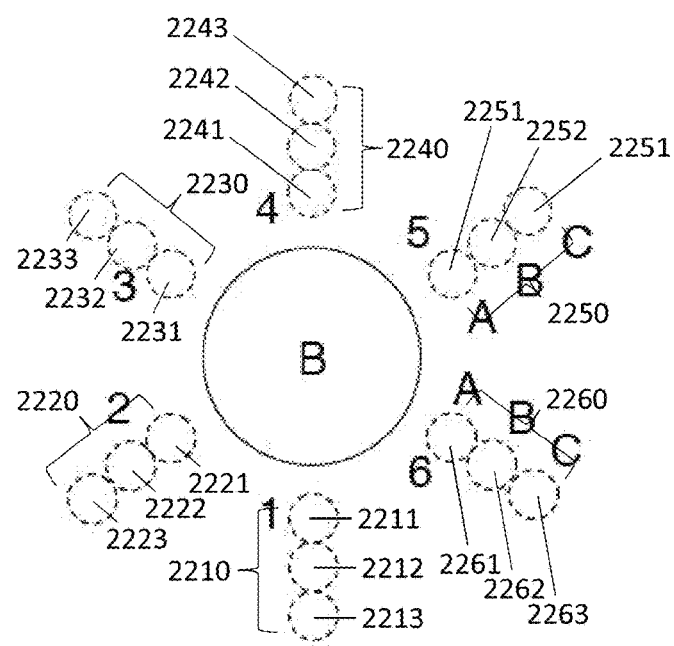
FIG. 22A shows a schematic diagram of the LED configuration in accordance with alternative embodiment of the present invention.

FIG. 20A shows the LED and button configuration in accordance with one embodiment of the present invention whilst FIG. 20B shows the geometry in deriving the configuration of FIG. 20A. As shown in FIG. 20A, a button 2010 with six LEDs 2001-2006 disposed about the button 2010 at 60 degree interval where the alignment of the each of the three pairs of LEDs 2001 and 2004, 2002 and 2005, and 2003 and 2006 form a straight line. Each of the LEDs 2001-2006 cooperates to serve as an indication of battery charge level. In an embodiment, LEDs 2001 and 2002 lit when the user press the button 2010, which indicates ⅓ of battery charge level. The location of the six LEDs 2001-2006 are determined by a specific geometry configuration as shown in FIG. 20B. In FIG. 20B, six circles with the same diameter as the button 2010 coincident at the centre of button 2010 while the six LEDs 2001-2006 are each disposed at on a point of the circumstance of the circle which is the most far from other circles.

FIGS. 21A to 21F shows the LEDs lighting sequence of the six LED 2001-2006 of FIG. 20A. Preferably, the LEDs light up in sequential order; for example LED 2001 lit and then LED 2002 lit. Each of the LEDs initially lit with a low light level and its intensity increase gradually until it reaches a maximum light level. A person skilled in the art would readily appreciate that the lighting sequence only illustrates one of the possible arrangement in this embodiment. In other words, the lighting may begin at any of the LEDs 2001-2006 in clockwise or anticlockwise direction until the last LED is turned on which indicate the battery charging is completed. The time between LED's turning on and time it takes for each LED to fade from low light level to high light level can be varied to give an array of possible visual effects as desired.

FIGS. 22A to 22D show an alternate LED and button configuration with alternate lighting sequence in accordance with one embodiment of the present invention. As shown in FIG. 22A to 22D, the configuration of the LEDs is fundamentally similar to the configuration shown in FIG. 20A to 20B, while each of the six LEDs group 2210, 2220, 2230, 2240, 2250 and 2260 is comprises of three aligned LEDs, for example LED group 2210 comprises of three LEDs: inner LED 2211, middle LED 2212 and outer LED 2213. The six inner LEDs form an inner ring, the six middle LEDs form a middle ring, and the six outer LEDs form an outer ring.

Preferably, the LEDs group may light up in sequential order; for example LED 2211 lit first and then LED 2212 lit and lastly LED 2213 lit, and after all the LEDs of the 2210 LEDs group lit the second LEDs group 2220 lit, and finally the last LED 2263 of LEDs group 2260 lit. Each of the LED initially lit with a low light level and its intensity increase gradually until it reaches a maximum light level. The sequence of LED's lighting would be the inner LED, middle LED, and lastly the outer LED.

Alternatively, the LED ring may light up in sequential order; for example each of the six LEDs 2211, 2221, 2231, 2241, 2251 and 2261 of the inner ring lit, then the six middle LEDs 2212, 2222, 2232, 2242, 2252 and 2262 of the middle ring lit, and lastly the six outer LEDs 2213, 2223, 2233, 2243, 2253 and 2263 of the outer ring lit.

It should be appreciated that the lighting sequence only illustrates one of the possible arrangement in this embodiment. In other words, the lighting may begin from any of the LED of the inner ring or outer ring in clockwise or anti-clockwise direction and until the last LED lits which indicate the battery charging is completed. The time between LED's lit and time it takes for each LED to fade from low light level to high light level can be varied to give an array of possible visual effects as desired.

Figure 23A:
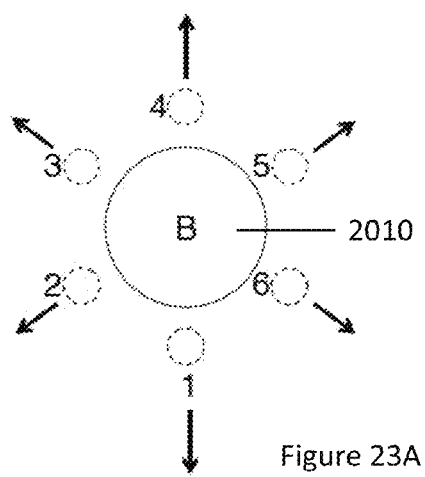
FIG. 23A shows a schematic diagram illustrating the lighting sequence of the LEDs of the LED configuration as shown in FIG. 20A when the battery is switched off.
Figure 23B:
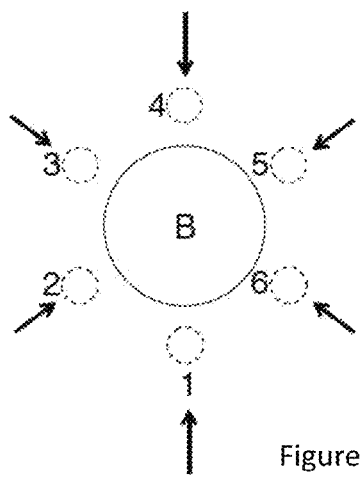

FIGS. 23A to 23B show the lighting sequence of the six LEDs of FIG. 20A when the present embodiment is switched on or switched off. Preferably, the battery is turned on or off by holding the power button 2010 for a predetermined period, for example 3 seconds in the present embodiment. When the power button 2010 is held for 3 seconds so as to switch off the device, all LEDs turn on simultaneously to their maximum or high light level and then fade to off over a specified period of time. Similarly, when the power button 2010 is hold for 3 seconds for switching off, all LEDs fade from off to their maximum or high light level over a specified period of time. A person skilled in the art would readily appreciate that the lighting sequence only illustrates one of the possible arrangement in this embodiment.

Advantageously, with the aforementioned LEDs configuration and interface, some examples of these interfaces may illuminate and indicate the remaining charging level of the battery and the progress of battery charging such that the user can become intuitively aware of the overall usage of the battery charge. In turn, one may recharge the power battery with any power source at good time before the power battery becomes discharged (indicated by one LED light) to utilise the battery cycle of the battery. Furthermore, with the LED configuration above, if the power button is being pressed accidentally, the LEDs will hint the user to switch off the battery to preserve the battery life.

Figure 24:
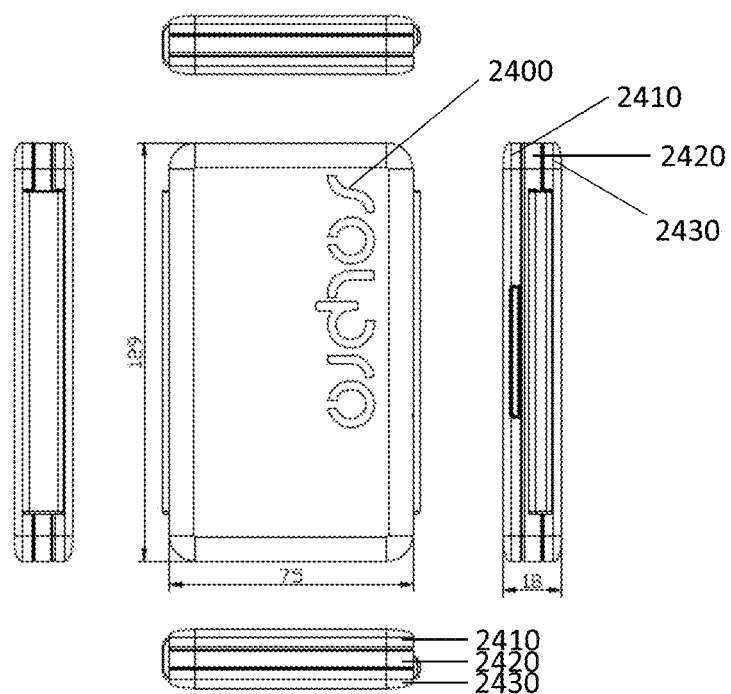
FIG. 24 shows a various view of a foldable three piece multi-chain daisy solar panel assembly in a closed configuration in accordance with one embodiment of the present invention.

FIG. 24 show the various views of a foldable three piece multi-chain daisy solar panel assembly 2400 in a closed configuration in accordance with one embodiment of the present invention. As shown in FIG. 24, the three layers of cover 2410, 2420 and 2430 are mounted substantially flush with each other. In particular, the lower surface of the first layer 2410 is arranged to face towards the upper surface of the second layer 2420, and the lower surface of the second layer 2420 is arranged to face towards the lower surface of the third layer 2430 such that the three pieces of solar panels are substantially concealed by the solar panel assembly 2400.

Figures 25A, 25B:
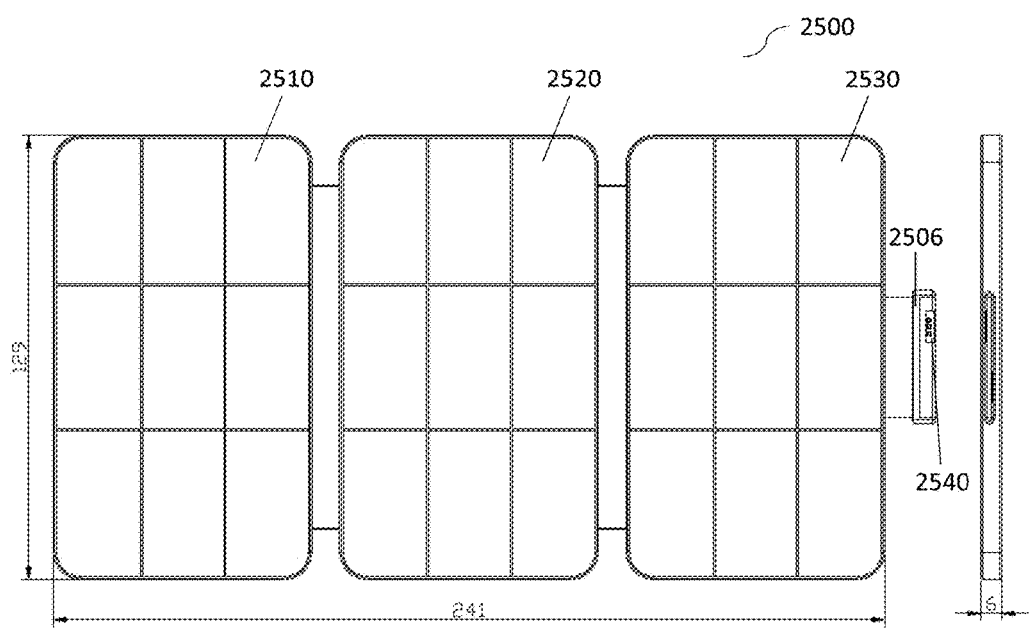
FIG. 25A shows a plan view of a foldable three piece multi-chain daisy solar panel assembly in an expanded configuration in accordance with one embodiment of the present invention.
FIG. 25B shows a side view of a foldable three piece multi-chain daisy solar panel assembly in an expanded configuration in accordance with one embodiment of the present invention.
Figure 25C:
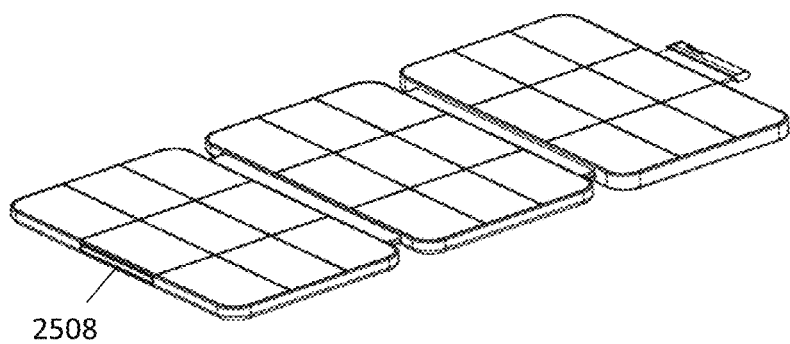
FIG. 25C shows a perspective view of a foldable three piece multi-chain daisy solar panel assembly in an expanded configuration in accordance with one embodiment of the present invention.
Figure 25D:
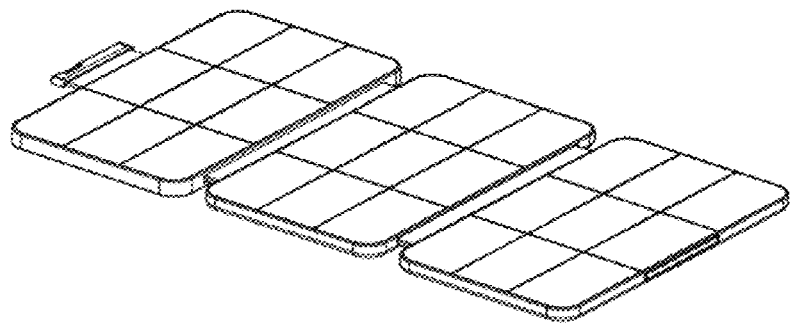
FIG. 25D shows yet another perspective view of a foldable three piece multi-chain daisy solar panel assembly in an expanded configuration in accordance with one embodiment of the present invention.
Figure 26A:
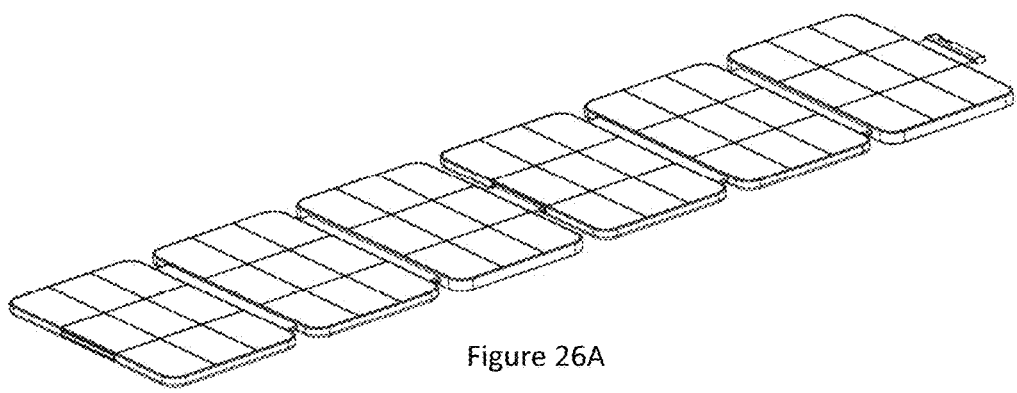
FIG. 26A shows a perspective view illustrating the two identical foldable three piece multi-chain daisy solar panel assemblies as shown in FIG. 25A in connection in accordance with one embodiment of the present invention; and, FIG. 26B shows a perspective view illustrating the two identical foldable three piece multi-chain daisy solar panel assemblies as shown in FIG. 25A in connection in accordance with one embodiment of the present invention.
Figure 26B:
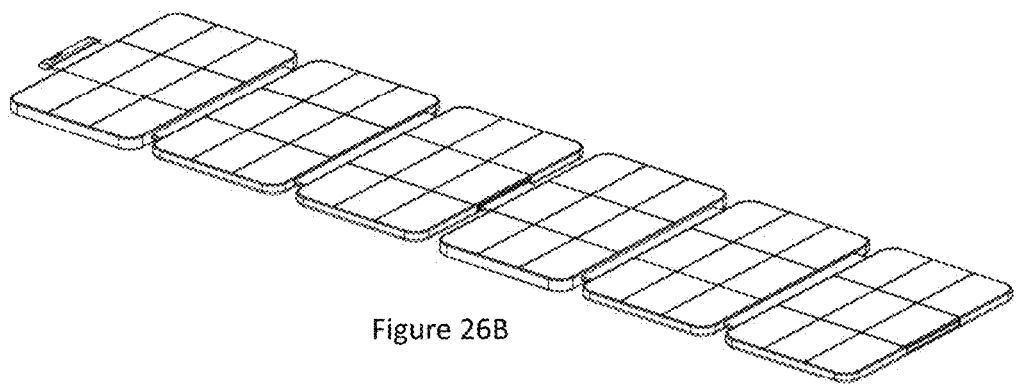

FIGS. 25A to 25B show the plan view and side view of the solar panel assembly 2500 in an expanded configuration in accordance with one embodiment of the present invention. In FIGS. 25A to 25D, the first layer 2510, second layer 2520 and third layer 2530 are expanded to form a multi-chain daisy solar panel such that all the three layers can be aligned in series to form a chain with the three pieces of solar panel exposed (facing upwards in FIG. 25A). Still refer to FIGS. 25A to 25D, the solar panel 2500 further includes a body with a connection portion 2506, where the connection portion 2506 includes an electrical arrangement for connecting the solar panel assembly 2500 with another solar panel assembly 2500' as shown in FIGS. 26A to 26B.

In the present embodiment, the electrical arrangement includes three electrical contacts 2540A-2540C arranged in the connecting portion 2506 of the first solar panel assembly 2500. Preferably, the three electrical contacts 2540A-2540C each extend from one side of the connection portion 2506 to another side of the connection portion 2506. This allows the solar panel assembly 2500 to be reversibly connectable with any electronic devices (not shown in the figure). In other words, the electrical connection between the solar panel assembly 2500 and the designated electronic device can be established with the solar panels faces towards the designated electronic device, or with the solar panel assembly 2500 arranged such that the solar panel faces away from the designated electronic device.

More specifically, the body of the solar panel assembly 2500 also includes a slot that define a connection port 2508 arranged to receive the connection portion 2506 of another solar panel assembly 2500'. Preferably, the electrical arrangement is arranged to establish electrical connection of the circuit in the first solar panel assembly 2500 with the circuit in the solar panel assembly 2500' as shown in FIGS. 26A to 26B, such that energy may be transferred from the first and second solar panels and their associated circuit in the panel assemblies to the designated power storage module and its associated circuit (not shown in the figure) for storage and for use by en electronic device (not shown in the figure) connected with the solar panel assemblies.

In one of the embodiment, the solar panel assembly 2500 may further include a circuit control unit such that the maximum current output of the chained solar panel assembly is controlled within 1 mA to ensure that the current output would not overcharge the designated electronic device. It should be understood that the desired maximum current output of the chained solar panel is not limited to 1 mA and this parameter may be adjusted to adapt in other electronic devices.

Although the above description provides detailed description with respect to different embodiments of the casing, it should be noted that in the present invention, different features in different embodiments of the casing of the present invention may be used separately or in combination in one embodiment of the casing. For example, the features in the embodiment of the casing of FIGS. 1A-4, in the embodiment of the casing of FIGS. 6A-10B, in the embodiment of FIGS. 11A-12C, in the embodiment of the casing of FIG. 13, and in the embodiments of the casing of FIGS. 14-18 can be used interchangeably, separately or in combination in different embodiments of the present invention. Also, in some other embodiments, one or more solar panels may be arranged or further arranged on the frame of the casing.

The embodiments of the present invention are particularly advantageous in at least a number of aspects. Firstly, the present invention provides a casing for an electronic device that can substantially encase the electronic device, thereby preventing damages of the electronic device due to dropping or scratching, etc. Secondly, the present invention provides a casing with a frame and a removable cover in which the removable cover is reversibly connectable with the frame. This is not only convenient to the user, but it also allows the user to control the orientation of the solar panel on the cover and hence determine whether to utilize solar energy. The present invention also provides specific magnetic and electrical arrangements between the cover and the frame. In particular, the magnetic arrangement is arranged to automatically connect and align the cover with the frame, and the electrical arrangement enables the cover to be reversibly connected with the frame. The electrical arrangement also minimizes the chance in which dust or debris in the connection ports of the frame may interference or affect the electrical connection between the frame and the cover. Other advantages of the present invention in terms of structure, construction, function, cost, manufacturing ease, etc., will become apparent to a person skilled in the art after considering the above detailed description.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A casing for an electronic device, comprising a frame having:
    a first electrical port arranged to receive a removable solar panel member, and
    a power storage module arranged for storing energy for use by the electrical device;
    wherein the power storage module is arranged to receive energy from the solar panel member when the solar panel member is connected to the first electrical port, and the solar panel member comprises:
        a body having one or more solar panels mounted thereon, and
        an electrical connection portion reversibly connectable with the first electrical port.

2. A casing in accordance with claim 1, wherein the frame further comprises a second electrical port arranged to connect the power storage module with the electronic device, and the power storage module is arranged to supply energy to the electronic device when the electronic device is connected with the second electrical port.

3. A casing in accordance with claim 2, wherein the frame further comprises a third electrical port arranged to connect the power storage module with an external power source, and the power storage module is arranged to receive energy from the external power source when the external power source is connected to the third electrical port.

4. A casing in accordance with claim 3, wherein the power storage module is arranged to simultaneously receive energy from the external power source and supply energy to the electronic device when both the electronic device and the external power source are connected to the second and third electrical ports.

5. A casing in accordance with claim 3, wherein the power storage module is arranged to be charged by the solar panel member or by the external power source or by both simultaneously.

6. A casing in accordance with claim 1, wherein the solar panel member is reversibly connectable with the frame.

7. A casing in accordance with claim 1, wherein the frame includes a body that defines a cavity for receiving the electronic device.

8. A casing in accordance with claim 7, wherein the body includes a flexible cap portion arranged to be manipulated for inserting the electronic device into the cavity.

9. A casing in accordance with claim 7, wherein the body includes one or more through-holes formed thereon to correspond to a position of a camera or one or more button of the electronic device.

10. A casing in accordance with claim 7, wherein the frame further includes a jack plug arranged to be inserted into a corresponding jack of the electronic device.

11. A casing in accordance with claim 10, wherein the jack plug is movably formed on the body.

12. A casing in accordance with claim 11, wherein the jack plug is arranged to be moved and engaged with the solar panel member for supporting the casing in a standing configuration.

13. A casing in accordance with claim 7, wherein the frame further comprises an indicator module is arranged on the body for displaying information relating to the power storage module.

14. A casing in accordance with claim 13, wherein the indicator module comprises one or more LEDs.

15. A casing in accordance with claim 1, wherein the body of the solar panel member is substantially symmetric about a transverse axis or a longitudinal axis thereof.

16. A casing in accordance with claim 1, wherein the electrical connection portion is flexible.

17. A casing in accordance with claim 1, wherein the electrical connection portion has a rounded edge and the first electrical port has an angled edge such that a clearance is formed between the electrical connection portion and the first electrical port when the electrical connection portion is connected with the first electrical port.

18. A casing in accordance with claim 1, wherein the solar panel member is arranged to connect with the first electrical portion by a magnetic arrangement.

19. A casing in accordance with claim 18, wherein the magnetic arrangement comprises a first magnet member arranged in the electrical connection portion, and a corresponding second magnetic member arranged in the first electrical port.

20. A casing in accordance with claim 1, wherein the solar panel member is arranged to connect electrically with the first electrical portion by an electrical arrangement.

21. A casing in accordance with claim 1, wherein the electrical connection portion is in the form of a lip, and the first electrical port is an elongated slot shaped to receive the lip.

22. A casing in accordance with claim 1, wherein the body of the solar panel member comprises a rubberized edge for supporting the casing in a standing configuration.

23. A casing in accordance with claim 1, wherein a pocket is formed in or on the body of the solar panel member.

24. A casing in accordance with claim 8, wherein the flexible cap portion is arranged to be continuously engaged to the body when upon the flexible cap portion is manipulated for inserting the electronic device into the cavity.

25. A casing in accordance with claim 1, wherein the body includes a curved profile arranged to have a curvature formed by having a geometry defined by at least two curves meeting at co-tangents.

26. A casing in accordance with claim 1, wherein each of the solar panel members is positioned so as to minimize any signal transmission interference of the electronic device housed within the cavity.

27. A casing in accordance with claim 26, wherein each of the solar panel members are positioned away from being adjacent to the top or bottom edge of the electronic device.

* * * * *